United States Patent [19]

Meyerhoefer et al.

[11] Patent Number: 5,666,186

[45] Date of Patent: Sep. 9, 1997

[54] TEXT INTERFACE FOR STILL PHOTOGRAPHIC CAMERA WITH DATA RECORDING CAPABILITY

[75] Inventors: Daniel Timothy Meyerhoefer, Penfield; James Vergil Leavy, Churchville; J. David Cocca, Pittsford; Michael Timothy Malley, LeRoy; Gerald Julius Kosarko, Rochester; Robert Gordon Hills, Spencerport, all of N.Y.

[73] Assignee: Eastman Kodak Company, Rochester, N.Y.

[21] Appl. No.: 277,866

[22] Filed: Jul. 20, 1994

[51] Int. Cl.⁶ .................. G03B 17/00; G03B 17/24
[52] U.S. Cl. .................. 396/281; 396/310
[58] Field of Search .................. 354/289.12, 475, 354/105, 106

[56] References Cited

U.S. PATENT DOCUMENTS

| | | | |
|---|---|---|---|
| 4,497,552 | 2/1985 | Howard et al. | 354/106 |
| 5,040,016 | 8/1991 | Ishikawa et al. | 354/412 |
| 5,060,006 | 10/1991 | Taniguchi et al. | 354/419 |
| 5,103,250 | 4/1992 | Arifuku et al. | 354/106 |
| 5,155,513 | 10/1992 | Matsamura et al. | 354/106 |
| 5,198,851 | 3/1993 | Ogawa | 354/412 |
| 5,210,566 | 5/1993 | Nishida | 354/402 |
| 5,218,399 | 6/1993 | Izumi et al. | 354/471 |
| 5,241,334 | 8/1993 | Kobayashi et al. | 354/195.1 |
| 5,258,795 | 11/1993 | Lucas | 354/289.12 |
| 5,289,217 | 2/1994 | Rosenblatt | 354/76 |
| 5,302,990 | 4/1994 | Satoh et al. | 354/106 |
| 5,434,634 | 7/1995 | Yoshida | 354/106 |

*Primary Examiner*—Howard B. Blankenship
*Assistant Examiner*—Daniel Chapik
*Attorney, Agent, or Firm*—Marc Rossi

[57] ABSTRACT

A camera system includes a user friendly interface to enable a camera user to enter text data to be printed on a photographic film in a simple and convenient manner. The user interface is also used to display text messages to the user indicating certain camera conditions. More specifically, a camera is provided that includes a display unit, a display control interface for manually selecting text data to be displayed on the display unit and a control unit for controlling the operation of the display unit to display the text data selected by the manual user interface. The display unit preferably includes a text data display section and fixed icon display section.

7 Claims, 21 Drawing Sheets

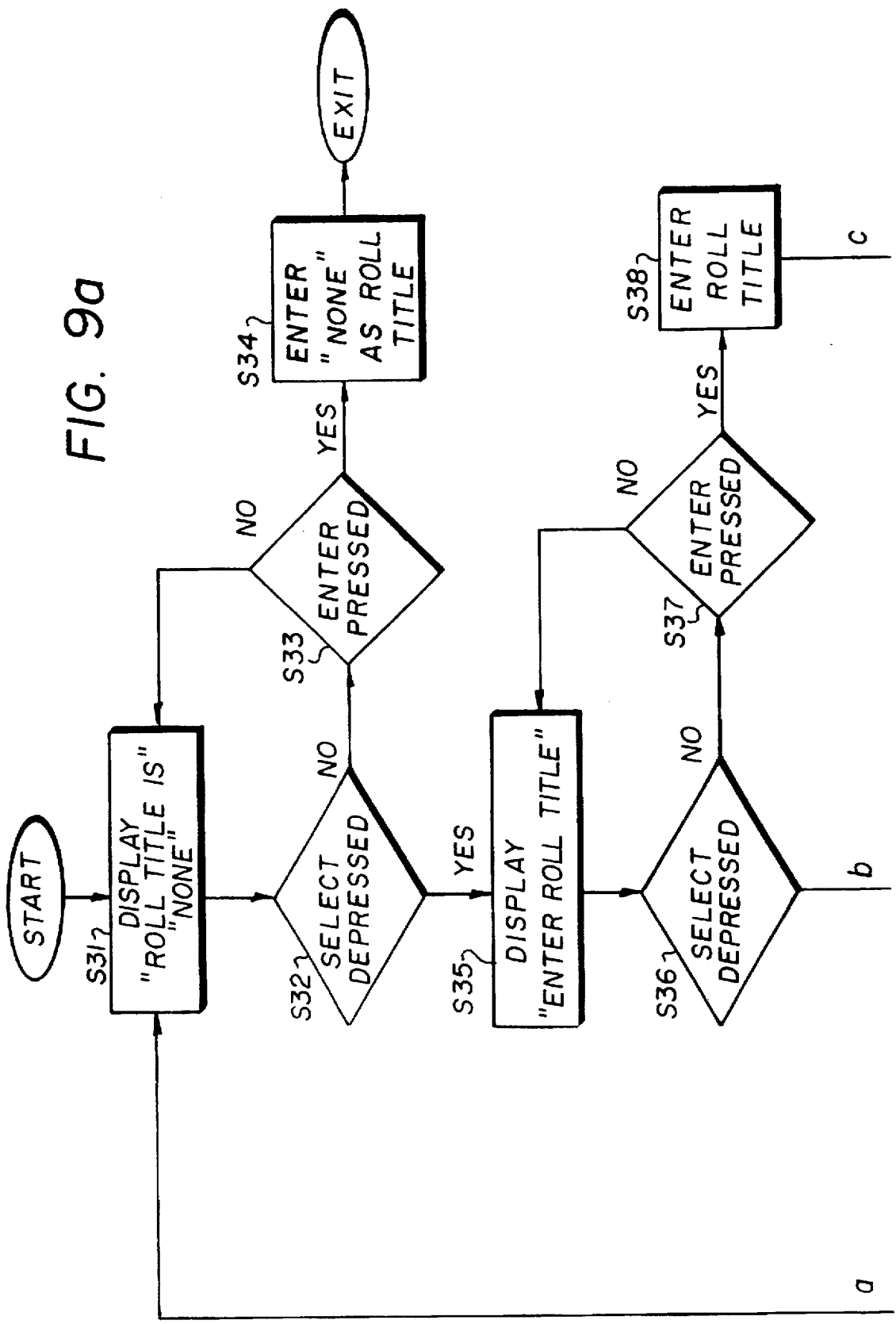

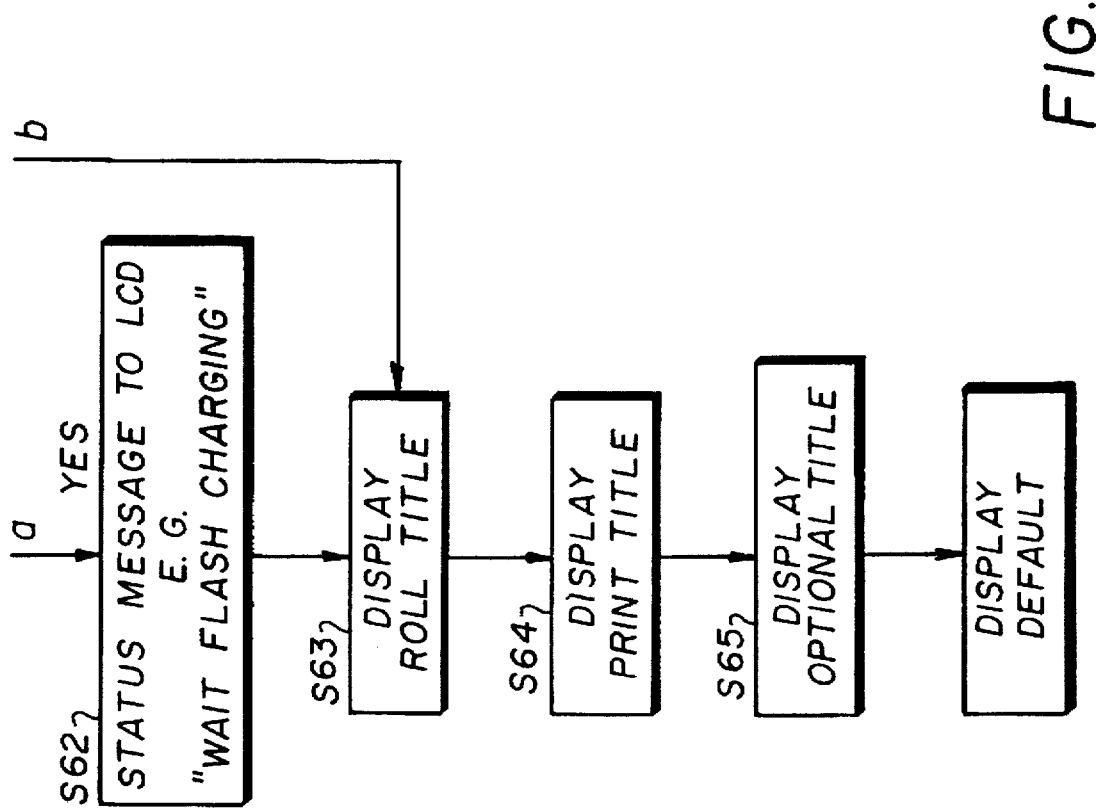

TEXT INTERFACE FOR STILL PHOTOGRAPHIC CAMERA WITH DATA RECORDING CAPABILITY

FIELD OF THE INVENTION

The invention relates in general to still photographic camera systems having the capability of recording data on a photographic film. The invention relates in particular to providing a simple text entry interface to allow a user to enter selected text data as the data to be recorded.

BACKGROUND

Many still photographic camera systems have mechanisms to permit the printing of time and date information directly onto a frame of photographic film when the film is exposed to take a picture. More recently, still photographic camera systems have been proposed that permit other information, such as messages, to be recorded on the photographic film in addition to the traditional time and date information. U.S. Pat. No. 5,220,366, for example, discloses a message receiving data back for a camera in which message information, received through radio pager receiver, is displayed on a display and can be subsequently printed on photographic film loaded in the camera by a data placing device. In this system, however, it is not possible for the camera user to directly enter a message to be printed on the photographic film.

Accordingly, it is an object of the invention to provide a camera system that incorporates a user friendly interface to enable a camera user to enter text data to be printed on a photographic film in a simple and convenient manner. It is a further object of the invention to enable the user to receive information regarding the operating state of the camera through the interface.

SUMMARY OF THE INVENTION

The invention provides a camera system that includes a user friendly interface to enable a camera user to enter text data to be printed on a photographic film in a simple and convenient manner. The user interface is also used to display text messages to the user indicating certain camera conditions.

More specifically, a camera is provided that includes a display unit, a display control interface for manually selecting text data to be displayed on the display unit and a control unit for controlling the operation of the display unit to display the text data selected by the manual user interface. The display unit preferably includes a text data display section and fixed icon display section.

A text data recording mechanism is also provided to record the text data selected by the display control interface on a photographic film loaded in the camera. The text data recording mechanism can include an array of light emitting elements to record the text data in human readable form or an encoding mechanism, such as a magnetic head, for encoding the text data on the photographic film in machine readable form.

The text data includes roll title data and print title data that is recorded on the photographic film by the text data recording mechanism. A storage unit is provided to store at least one of a roll title and a print title that is selected by the display control interface. Alternatively, prestored text data is stored in the storage unit that can be selected by the display user interface for display on the display unit. The storage unit preferably comprises a removable memory unit that can be inserted and removed from the camera.

Other features and advantages of the system will be described in greater detail with reference to certain preferred embodiments of the invention.

BRIEF DESCRIPTION OF THE DRAWINGS

The invention will be described in greater detail in the following description of the preferred embodiments with reference to the accompanying drawings, in which:

FIG. 7 is a schematic representation of the memory unit shown in. FIG. 6;

FIGS. 9a–9b are a general flow diagram showing a text annotation function for a roll title menu feature;

FIGS. 10a–10b are a general flow diagram illustrating the operation of the camera in a picture taking mode;

DETAILED DESCRIPTION OF PREFERRED EMBODIMENTS

Figure 1:
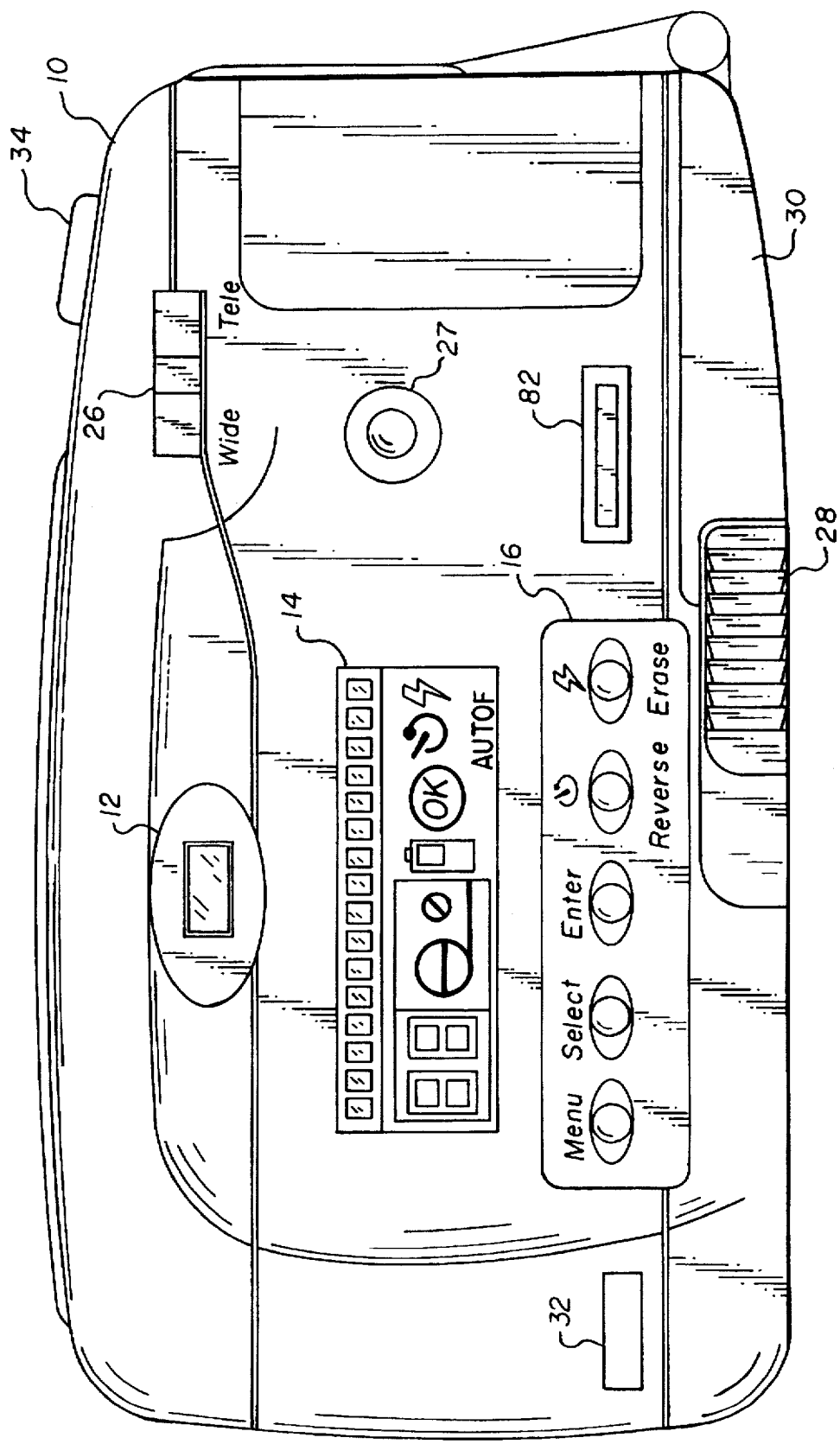
FIG. 1 is a back view of a photographic still camera incorporating the invention.
Figure 2:
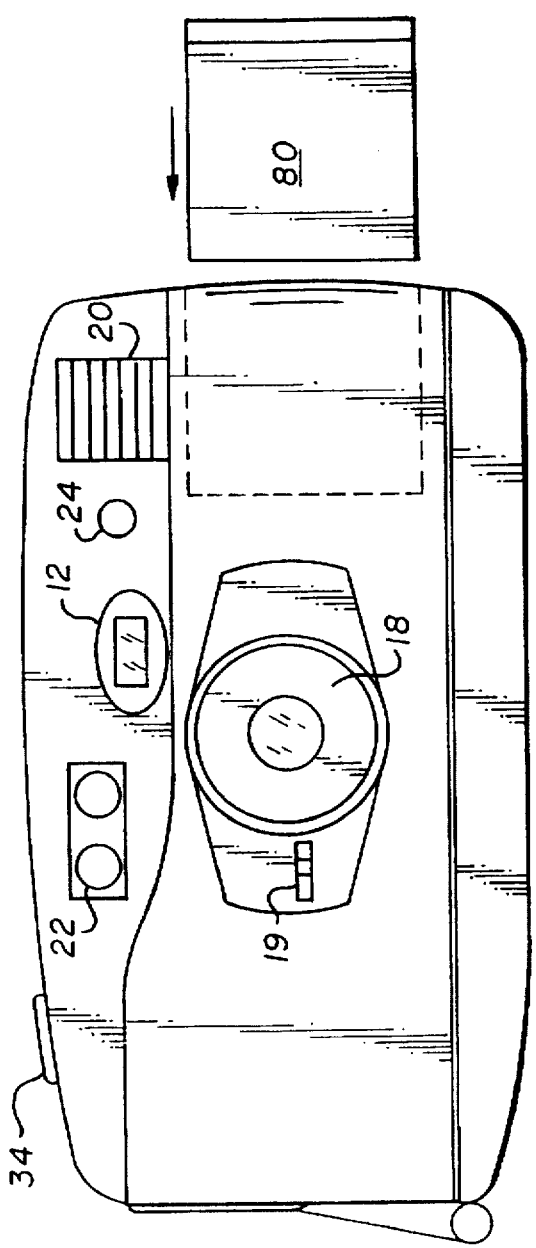
FIG. 2 is a front view of the camera illustrated in FIG. 1.

Back and front views of a photographic still camera 10 incorporating the invention are respectively shown in FIGS. 1 and 2. The camera 10 includes a viewfinder 12, a display unit 14, a display control interface 16, a lens system 18, an electronic flash unit 20, an autofocus sensor 22, and a light metering sensor 24. The lens system 18 is preferably an electrically driven autofocus/telephoto lens system, the focal length of which is adjusted by the camera operator from a wide angle setting to a close-up telephoto setting by operating a telephoto control switch 26 located on the back of the camera 10. A integral lens cover (not shown) is provided that can be moved to a closed position in front of the lens system 18 by a lens cover slide switch 19. An internal camera activation switch is activated to turn the camera 10 on when the integral lens cover is moved to the open position by the lens cover slide switch 19. Alternatively, the flash unit 20 can be incorporated into a "flip-up" lens cover that also activates the camera 10 when opened. The camera 10 incorporates a conventional motorized film advance system. A film cartridge is loaded by dropping it into a film slot located in the bottom of the camera 10, and leader from the film cartridge is automatically threaded onto a motor driven take-up spool. The film slot is accessed by operating a latch mechanism 28 to open a hinged film loading door 30 located at the bottom of the camera 10. A rewind control switch 32 is also provided to activate the motorized film advance system to rewind the film cartridge prior to removal. A two position shutter control switch 34 is provided to initiate an exposure operation. The shutter control switch 34 generates a first signal at the first position to initiate certain pre-exposure operations, such as performing light measurement and autofocus operations, and generates a second signal to initiate an actual exposure of the photographic film when the second position is reached. The display unit 14 preferably includes a text display segment 36, an icon display segment 38 and an alpha-numeric display segment 40 as shown in greater detail in FIG. 3. The text display segment 36 includes sixteen liquid crystal display (LCD) matrix elements 42 (5 column×7 row) that are used to display text data. The icon display segment 38 includes at least one LCD icon display element that is used to display a predetermined camera function or condition. For example, the illustrated icon display segment 38 includes a film cartridge/film advance element 44, a no film advance element 46, a battery condition element 48, an "OK" indicator element 50, a selftimer function indicator element 52, a flash function indicator element 54, and an autofocus indicator element 56. The alpha-numeric display segment 40 includes two LCD alpha-numeric elements 58.

Figure 3:
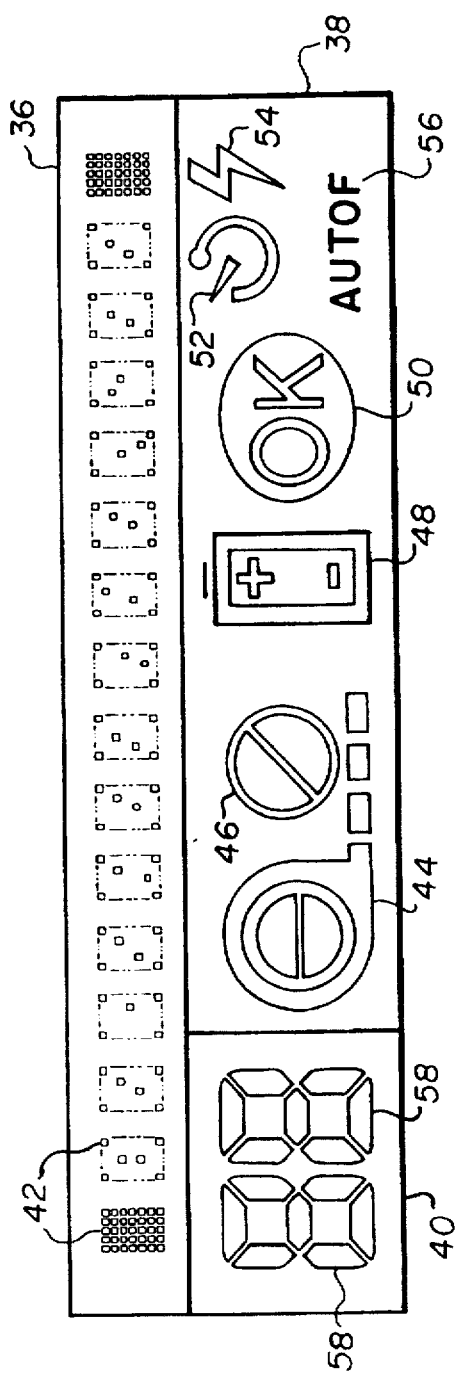
FIG. 3 illustrates a display unit, including a text display segment, an icon display segment and an alpha-numeric display segment, that is incorporated in the camera illustrated in FIGS. 1 and 2.
Figure 4:
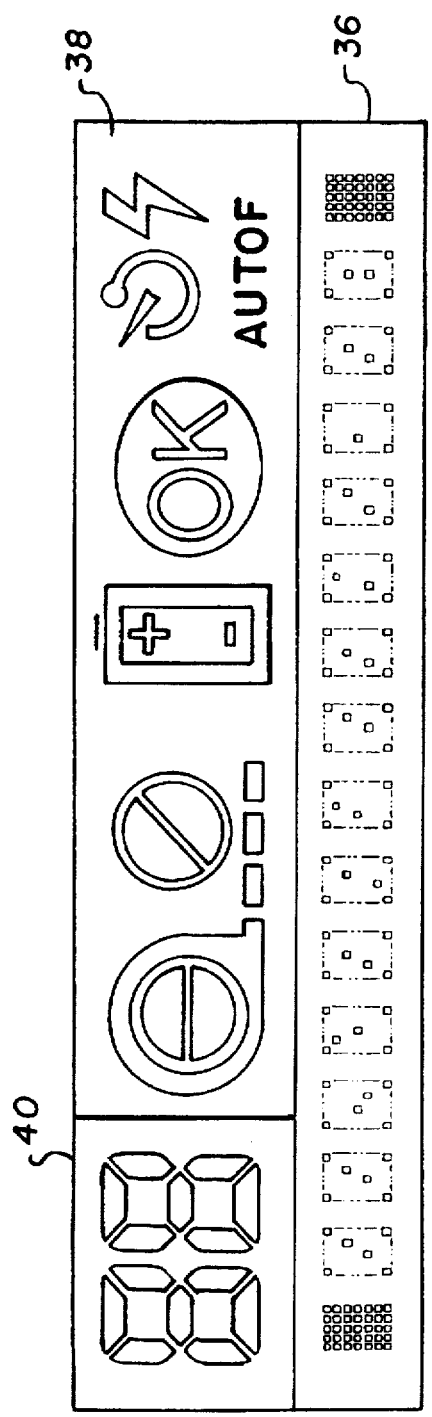
FIG. 4 illustrates a further embodiment of the display unit illustrated in FIG. 3 in which the physical placement of the text display segment, icon display segment and alpha-numeric display segment are modified.

Although the text display segment 36 is illustrated in FIG. 3 as being located above the icon display segment 38 and alpha-numeric display segment 40, it will be understood that the various segments may be arranged in any desired format. FIG. 4, for example, illustrates the placement of the text display segment 36 beneath the icon display segment 38 and the alpha-numeric display segment 40. In addition, the display unit 14 may also be located at any position readily viewable by the user, for example, on the top of the camera 10 instead of on the back.

The LCD segments within the display unit 14 can be electrically driven by a variety of methods. For example, the entire display unit 14, including the text display segment 36, the icon display segment 38 and the alpha-numeric display segment 40, can be driven by one LCD driver integrated circuit such as a NJRC6428/29, manufactured by New Japan Radio Company, Ltd., which has seventeen common output and sixty segment output lines, coupled to a microprocessor controller. Sixteen of the common output lines can be utilized to drive the 5×7 matrix elements 42 of the text display segment 36. The remaining common output line, in conjunction with the sixty segment lines, can be used to drive individual icons of the icon display segment 38 and the alpha-numeric elements 58 of the alpha-numeric display segment 40. It should be noted that the multiplex rate, along with other factors, determines what the contrast ratio of the display unit 14. The use of a single driver to drive all of the elements of the display unit 14 has the advantage of producing a consistent contrast ratio over the entire display unit 14.

Figure 5:
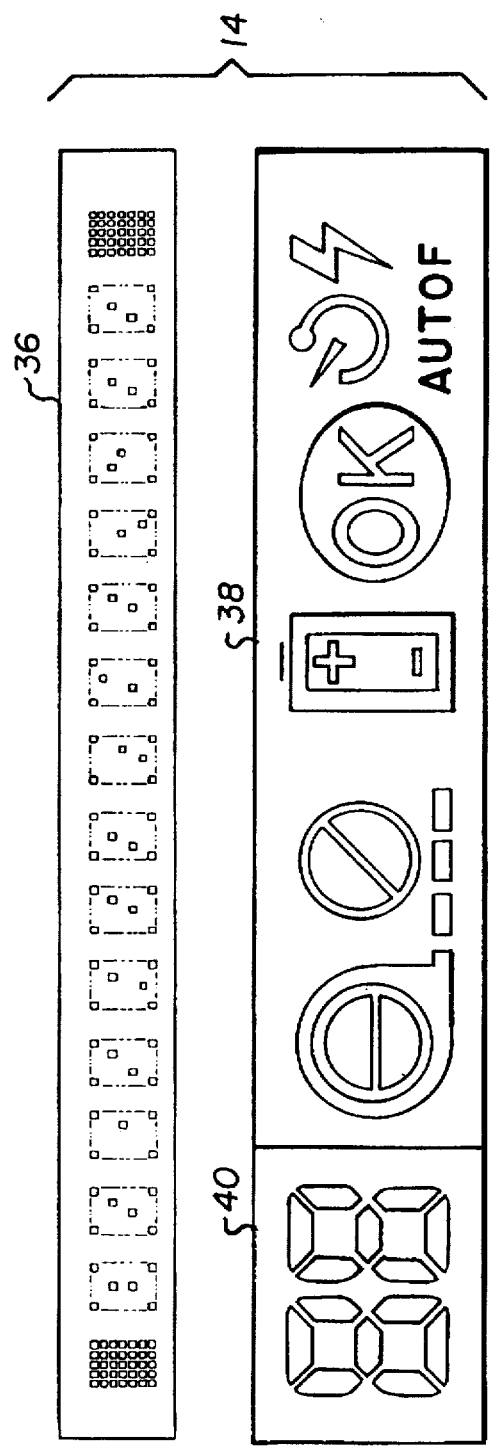
FIG. 5 illustrates a further embodiment of the display unit illustrated in FIG. 3, wherein the text display segment is separated, either physically or electrically, from the icon display segment and the alpha-numeric display segment.

The display unit 14 can also be electrically driven as if the text display segment 36, the icon display segment 38 and the alpha-numeric display segment 40 (or some combination thereof) were separate devices, by utilizing different drivers to drive different segments. The text display segment 36, for example, is preferable driven from a different driver than the icon display segment 38 and alpha-numeric segment 40, as illustrated by the separation of the text display segment 36 from the other segments in FIG. 5. Electrically separating the segments has the advantage of utilizing internal LCD drivers built into a microprocessor controller, used to control the overall functions of the camera, as will be described in greater detail. The internal microprocessor LCD drivers can handle multiplex rates of up to three or four, and can therefore be utilized to drive the icon display segment 38 and alpha-numeric segment 40, while a less expensive driver than the single drive previously discussed (for example a Samsung KS0068 16×40 LCD driver) is employed to drive the text display segment 36. In such a case, two multiplex rates would be employed to drive different LCD segments of a single device, one rate for the text display segment 36 and a different rate for the icon display segment 38 and alpha-numeric display segment 40. A disadvantage of having two multiplex rates to drive different segments of a single LCD device is a difference in the contrast ratio that will result between the two segments being multiplexed at the different rates. A multiplex rate of three or four in the icon display segment 38 and the alpha-numeric display segment 40 will give a considerably better contrast ratio than a rate of 1/16 or 1/18 required in the text display segment 36. Some reduction in the contrast difference can be achieved by increasing the bias voltage as high as possible in the text display segment 36 to boost its contrast, and lowering the bias voltage in the icon display segment 38 and the alpha-numeric display segment 40 to lower its contrast. A better approach, however, is to manufacture the display unit 14 such that the separate display segments are actually separate devices that utilize different fluids to better match the different multiplex rates applied to the devices. Alternatively, the display unit 14 can be manufactured from a single piece of glass that is separated into different fluid cells by epoxy seals, such that different fluids can be filled in the different cells to match the respective multiplex rates.

Figure 6:
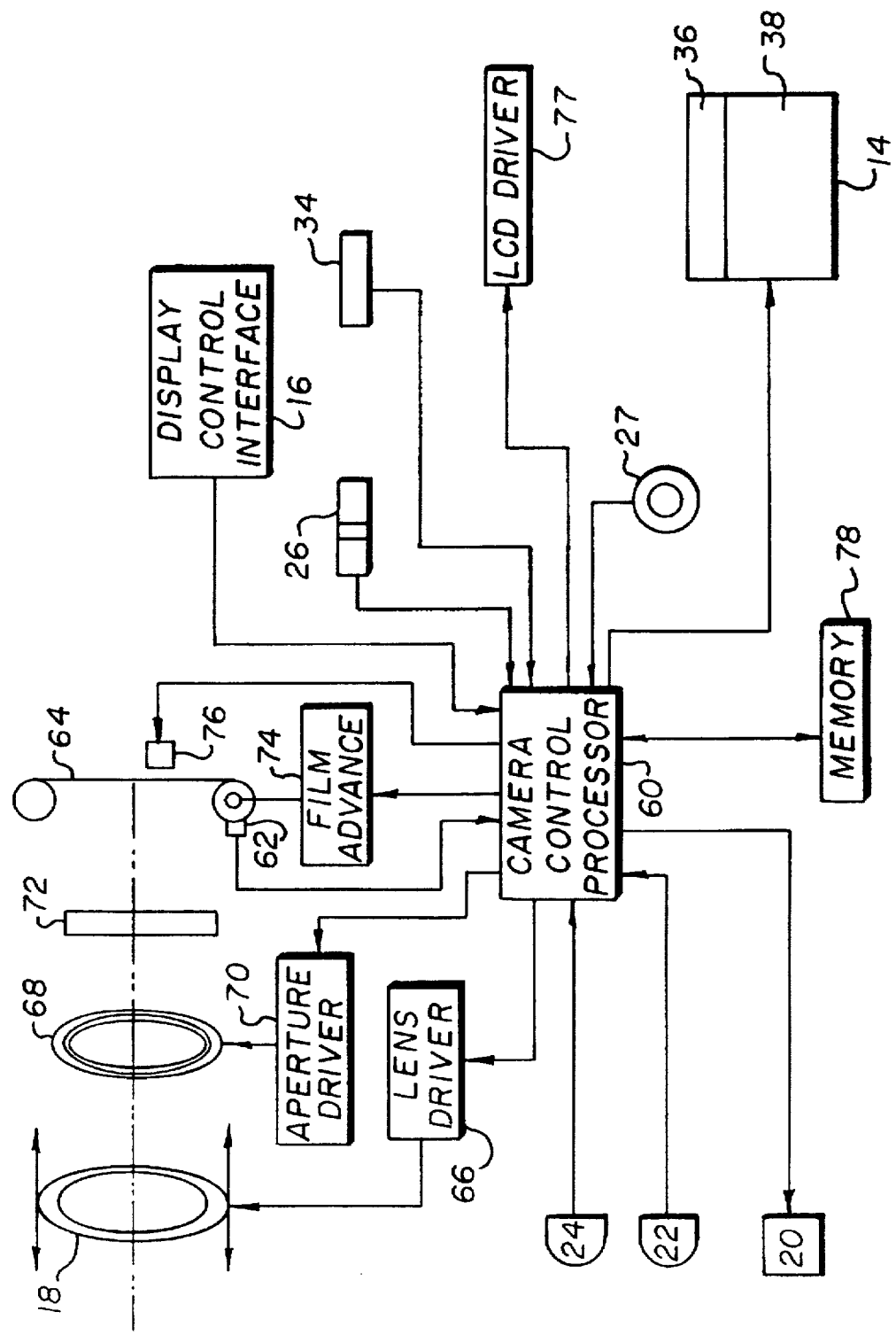
FIG. 6 is a schematic block diagram of the camera illustrated in FIGS. 1 and 2.

FIG. 6 illustrates a functional block diagram of the camera 10. The overall operation of the camera 10 is controlled by a camera control processor 60, for example, a Mitsubishi M38223M4 processor. The camera control processor 60 receives control signals from the display control interface 16, the telephoto control switch 26, the rewind control switch 32 and the shutter control switch 34, and data signals from the light metering sensor 24 and autofocus sensor 22. A film cartridge sensor 62 is provided to detect the presence of a film cartridge within the film slot 64 and to read encoded data from the film cartridge. In response to the received control and data signals, the camera control processor 60 controls the operation of a lens driver 66 to set the lens system 18 to the desired focal length and to properly focus a subject to be photographed, sets an aperture 68 through an aperture driver 70, and controls the operation of a shutter mechanism 72 and electronic flash unit 20 to properly expose the photographic film. The film advance unit 74 is then activated by the control processor 60 to advance the photographic film in the film cartridge to the next frame to be exposed.

The camera control processor 60 also controls the operation of the display unit 14. The icon display segment 38 and the alpha-numeric display segment 40 are directly driven by internal LCD drivers provided in the camera control processor 60. The text display segment 36, however, is driven by an LCD driver 78 coupled to the camera control processor 60. It will be understood that other driver configurations may be readily employed including directly driving all of the segments with the camera control processor 60 or using a single separate LCD driver as previously discussed. The provision of the text data segment 36 permits various camera messages to be displayed to the user and, more importantly, text data to be readily entered by the user as will be discussed in greater detail.

In addition to the above functions, the control processor 60 also controls the operation of a data writing device 76 to write data onto the photographic film. The data writing device 76 may include an array of light emitting diodes to print the data directly onto the photographic film in human readable form. Such arrays, for example, are routinely utilized in conventional cameras to print time/date information. In the preferred embodiment, however, the data writing device 76 is a magnetic read/write head that writes the data in machine readable form on a magnetic strip or layer provided on the photographic film and can also read data present on the magnetic strip or layer. The text data is then reproduced during the film developing process and printed on the back of a photographic print in human readable form by a printing device. Alternatively, the text data may also be optically recorded on the photographic film in machine readable form for subsequent reproduction by a printer.

The data written onto the photographic film by the camera 10 includes text data that is either entered via the display control interface 16 or recalled from a memory unit 78 coupled to the camera control processor 60 utilizing the display control interface 16. The text data includes a roll title, a print title, an optional title, and time, date information (or any combination thereof). The roll title allows the user to choose a title, for example "VACATION 94", that will be printed on the back of every picture of a given roll of film. The print title is a title that can be changed for each individual picture in a given roll. The user, for example, may take a vacation that includes visits to a number of different sites. Thus, the individual print title can be used to indicate a different location or subject. The optional title permits the user to add additional text annotation that will appear on each print of a roll in a similar manner as the roll title. The time/date information is set by the camera operator when the camera is first loaded with batteries and is updated automatically by the camera control processor 60.

Figure 7:
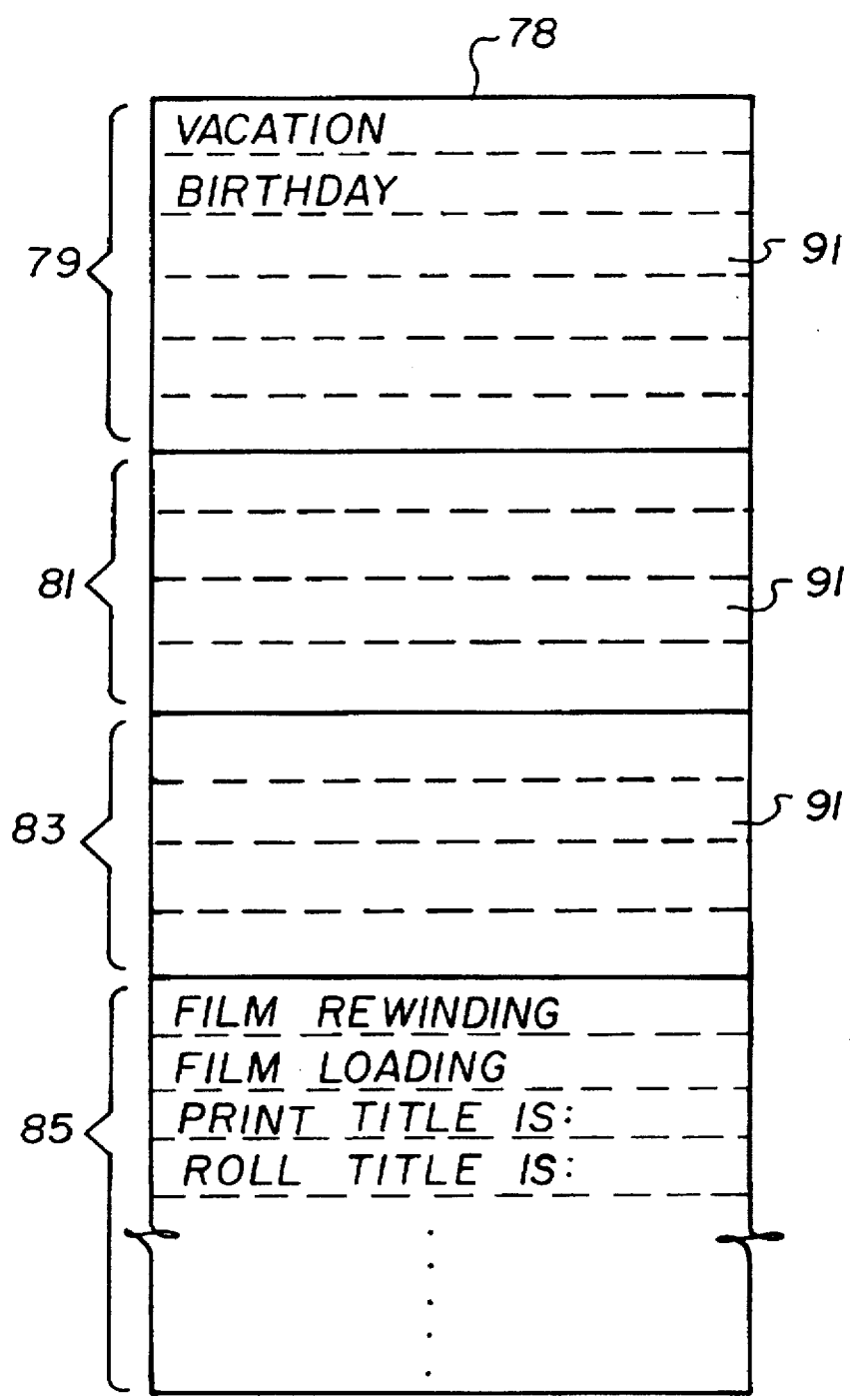

The memory unit 78 preferably includes non-volatile memory elements and is used to store a plurality of roll, print and optional titles, as well as standard camera messages. As shown in FIG. 7, the memory unit 78 includes a roll title storage section 79, a print title storage section 81, an optional title storage section 83 and a camera message storage section 85. Certain standard roll titles such as "VACATION" and "BIRTHDAY", as well as the camera messages, are preferably preloaded by the camera manufacturer, while roll, print or optional titles entered by the user can also be stored in storage locations 91 within their corresponding sections for use with a subsequent rolls or prints. The use of fixed standard roll titles such as "VACATION" and "BIRTHDAY" saves the user the time and effort of entering commonly used titles. Preloaded print and optional titles may also be provided instead of the preloaded roll titles or any combination of preloaded titles may be used.

It will be understood by those of ordinary skill in the art that, although illustrated as a separate element, the memory unit 78 may take the form of internal RAM and ROM memory provided within the camera control processor 60, separate memory devices or a combinations thereof. For example, in a preferred embodiment, the preloaded text data including titles and camera messages are contained within a ROM storage area provided within the camera control processor 60, while text data entered by the user to be stored for subsequent use with other rolls or prints is stored in a separate non-volatile memory device.

As shown in FIG. 1, the display control interface 16 includes five control buttons. The MENU button enables the user to scroll through a menu of different camera features or options that are displayed on the text display segment 36 of the display unit 14. A new feature is displayed every time the MENU button is depressed or the features scroll automatically if the MENU button is depressed and not released. The SELECT button is used to select a desired feature when it is displayed on the text display segment 36. Once a particular feature is selected, the SELECT button is further utilized to scroll through selections available for the selected feature. As with the MENU button, a new selection is presented each time the SELECT button is depressed or the selections are automatically scrolled when the SELECT button is held in the depressed state. The ENTER button is used to enter a desired selection when it appears on the text display segment 36. The REVERSE button is used to reverse the scrolling operation of the SELECT button. The ERASE button is used in a text annotation mode to erase the last selection entered by the depression of the ENTER button. In order to reduce the number of control buttons needed to operate the camera, the REVERSE and ERASE buttons are also used to respectively activate a selftimer feature and the flash function of the camera 10.

In a preferred embodiment, the output of the telephoto control switch 26 is also used to control the scroll forward operation (TELE position) and reverse scroll operation (WIDE position) in the same manner as the SELECT and REVERSE buttons. In the event that the camera does not include a telephoto lens system or it is not desired to use the telephoto control switch 26 to duplicate the operations of the SELECT and REVERSE buttons, a tracking ball 27 data entry device (also shown in FIG. 1) is preferably provided on the back of the camera 10 to duplicate the functions. In such cases, the telephoto control switch 26 and tracking ball 27 are considered part of the display control interface 16, although they are located in different positions from the panel containing the other buttons.

Figure 8A:
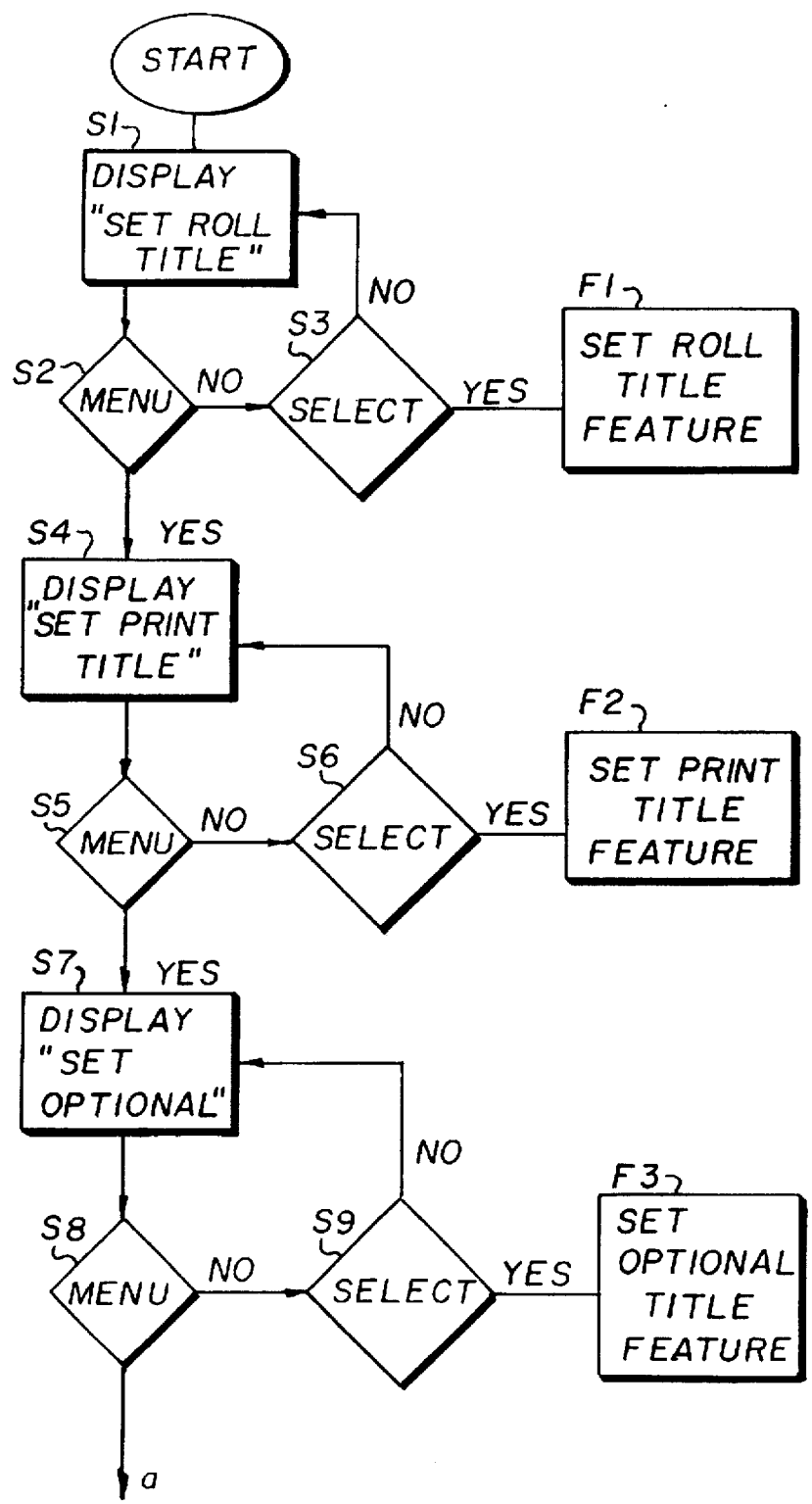
FIGS. 8a–8c are a general flow diagram illustrating the operation of the display unit and the display control interface incorporated in the camera illustrated in FIGS. 1 and 2 to enter text data.
Figure 8B:
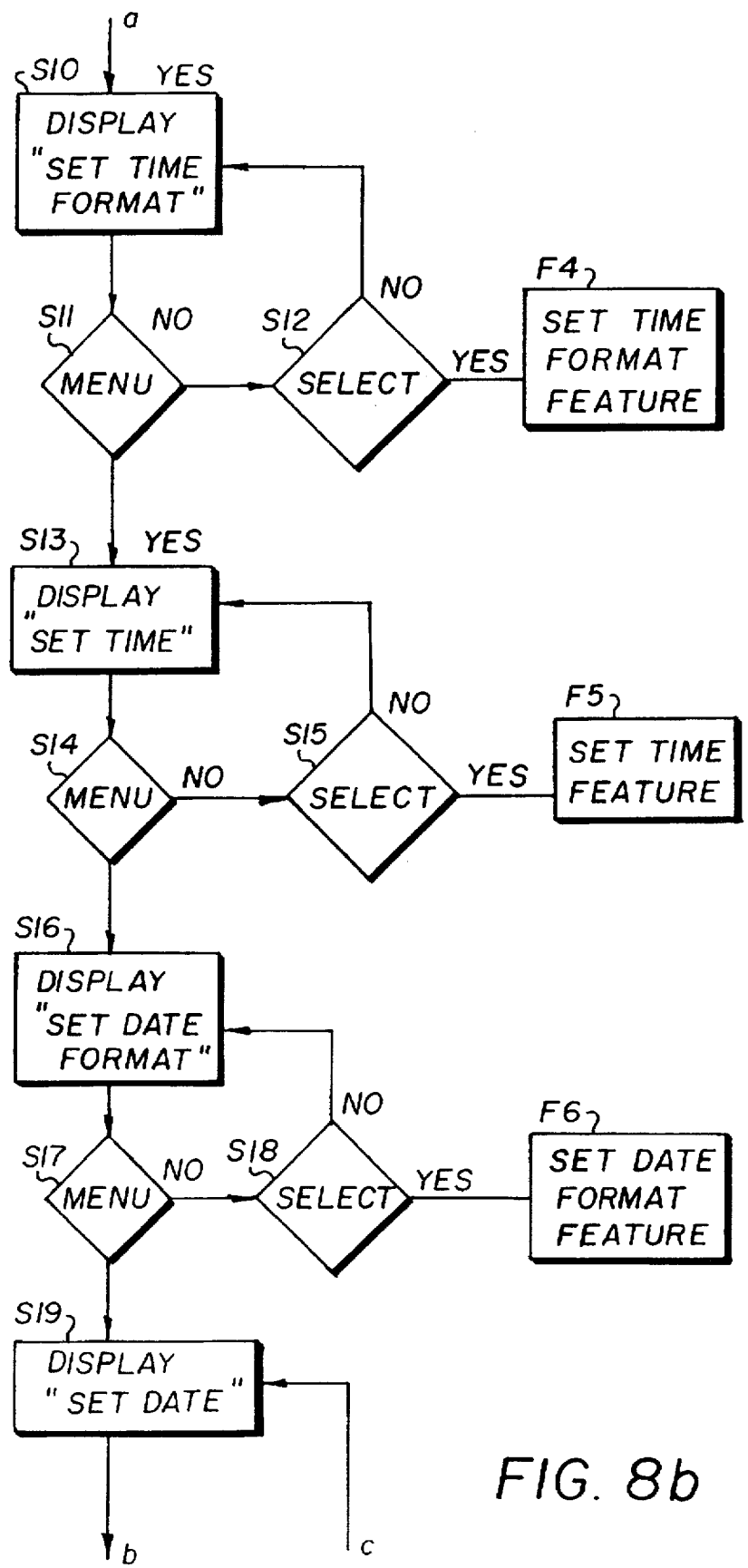
Figure 8C:
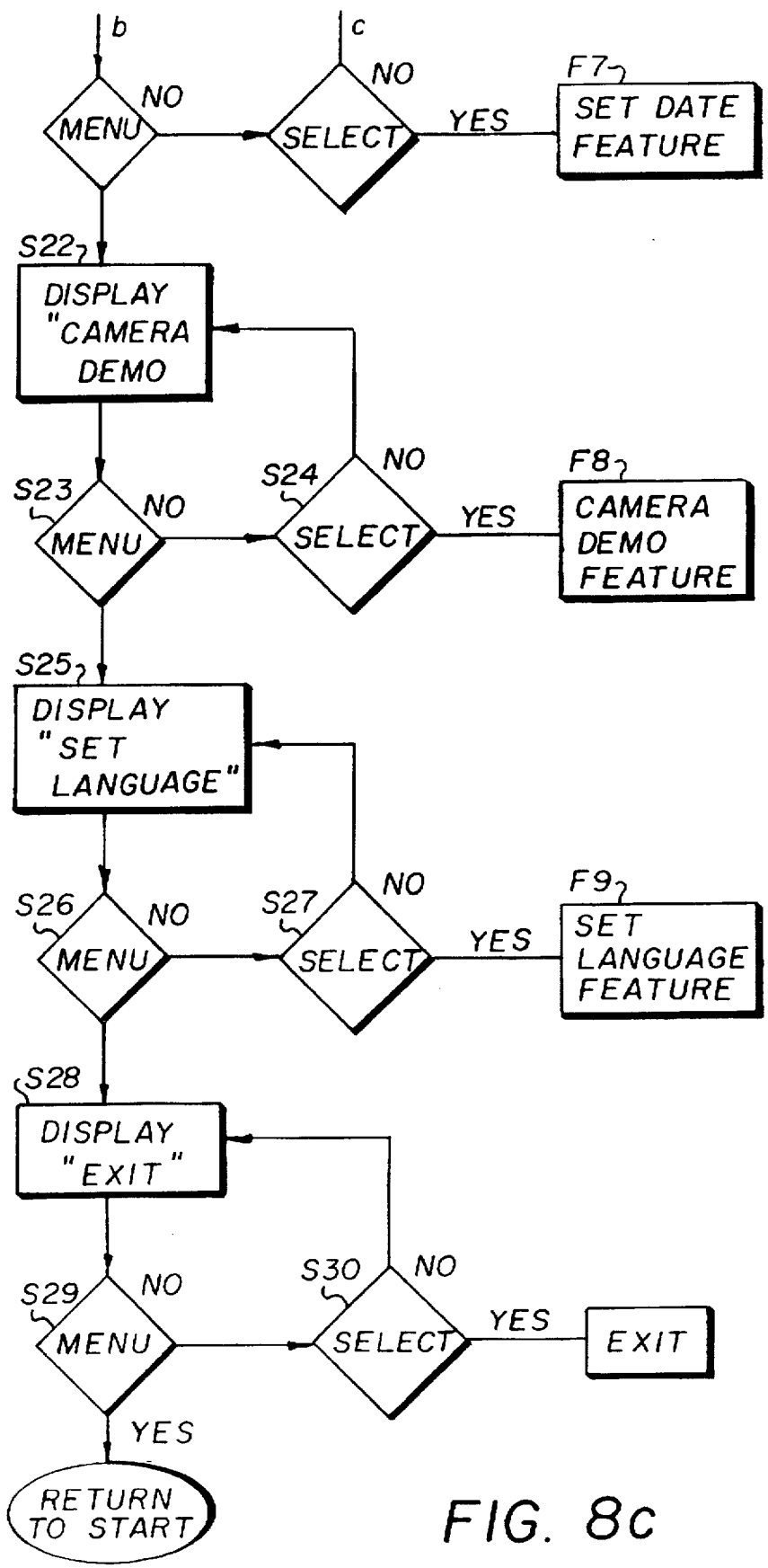

The operation of the display unit 14 and the display control interface 16 to enter text data will be described with reference to a general flow diagram shown in FIGS. 8a–8c. The MENU button is depressed to display various camera features including "SET ROLL TITLE", "SET PRINT TITLE", "SET OPTIONAL", "SET TIME FORMAT", "SET TIME", "SET DATE FORMAT", "SET DATE", "CAMERA DEMO", "SET LANGUAGE" and "EXIT" on the text display segment 36. The SELECT button is depressed to enter a desired feature at any point. For example, the first menu feature displayed on the text display segment 36 when the MENU button is depressed is "SET ROLL TITLE" (S1). If the MENU button is depressed a second time (S2), the second menu feature "SET PRINT TITLE" is display (S4). The process can be repeated to display any desired menu feature. A particular menu feature is selected by pressing the SELECT button. For example, the SET ROLL TITLE menu feature (F1) is selected by depressing the SELECT button (S3) when the "SET ROLL TITLE" message is displayed. If the SELECT button is depressed when the "EXIT" feature is displayed (S30), the camera 10 returns to a picture taking mode of operation and the date and film ISO are displayed on the text display segment 36.

Figure 9B:
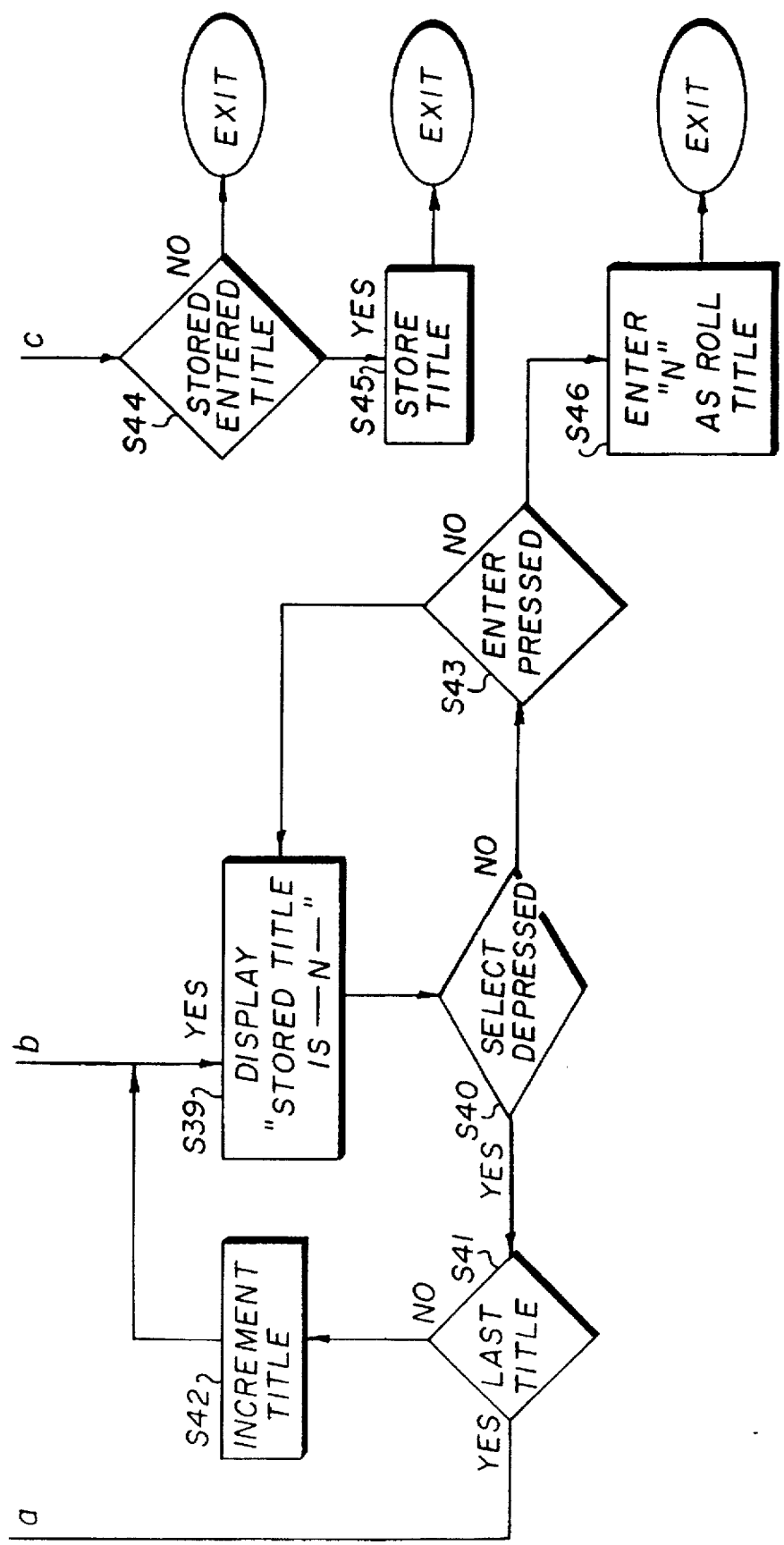

Once a menu feature is selected by depressing the SELECT button, various options for the selected feature can be scrolled by additional activations of the SELECT button. FIGS. 9a–9b, for example, is a flow diagram illustrating the operation of the SET ROLL TITLE feature (f1). The text display segment 36 first displays (S31) the message "ROLL TITLE IS: NONE". If the ENTER button is depressed while the message is displayed (S33), "NONE" is entered as the roll title in a temporary register in the camera control processor 60 or a temporary memory area in the memory unit 78 and operation is returned to the main menu. If the SELECT button is depressed, the next option message "ENTER ROLL TITLE" is displayed (S35). Depressing the ENTER button (S37) will place the camera operation in a text annotation mode (S38), wherein individual alpha-numeric characters are entered to create a roll title. After a roll title is completed and entered in temporary memory, a message "STORE ENTERED TITLE" is displayed on the text display segment 36 (S44). At this point, the user has the option of storing the entered title in the roll title storage section of the memory unit 78 for future use, for example by pressing the ENTER button, or returning to the main menu, for example by pressing the MENU button, if permanent storage of the roll title is not desired. If a prestored roll title is desired, the SELECT button is depressed (S36) to display the next option message "STORED TITLE IS: —N—", where N is the title stored in the first memory location in the roll title storage section of the memory unit 78. The displayed stored title can then be selected and entered (S43, S46) by pressing the ENTER button or the user can advance to the next stored title by depressing the SELECT button (S40, S41, S42). If all of the prestored roll titles are scrolled without the user making a selection, operation is returned to the step in which "NONE" is displayed on the text display segment 36. Once the roll title has been entered, either from the prestored list or created in the annotation mode, a conformation message "ROLL TITLE IS:", followed by the selected roll title, is displayed and operation returns to the main menu.

Characters for the roll title are preferably entered by utilizing the SELECT button to scroll through characters displayed on the text display segment 36. Specifically, a flashing cursor is first displayed on the first matrix element 42 of the text display segment 36. If the ENTER button is depressed, the flashing cursor is changed to a blank space, and a flashing cursor is displayed in the next matrix element 42. If a character or numeral is desired instead of a space, the SELECT button is depressed to cause the alpha-numeric characters (including a-to-z, 0-to-9 and any other desired characters such as *, !, etc.) to scroll in the associated matrix element 42. The ENTER button is then depressed when the desired character appears to enter the character and operation advances to the next matrix element 42. If the user unintentionally scrolls past a desired character, for example going to "B" instead of a desired "A", the REVERSE button is depressed to scroll back before depressing the ENTER button. As previously mentioned, the telephoto control switch 26 or the tracking ball 27 can alternatively be used to perform the scroll forward and reverse scroll functions of the SELECT and ENTER button, which may be more convenient for the user when the camera is held in a picture taking position. If an incorrect character is entered, the ERASE button is depressed to backspace and erase over the incorrect character. For example, if "VACATIOM" is entered. The ERASE button is hit once to erase the "M", and the SELECT button is depressed until an "N" appears. The ENTER button is then depressed to enter the "N" and complete the roll title "VACATION". The SET PRINT TITLE feature (F2) and SET OPTIONAL TITLE feature (F3) are functionally equivalent to the SET ROLL TITLE feature described above with reference to FIGS. 9a–9b, and therefore will not be described in greater detail.

If the SET TIME FORMAT feature (F4) option is selected, the user is given the opportunity to select between a 12 hour clock or a 24 hour clock. The 12 hour time format is the preferred default format. Upon entering the SET TIME FORMAT option, the message "12 HR" is displayed on the text display segment 36. If the SELECT button is pressed, the message is changed to "24 HR". The ENTER button is depressed to select either the "12 HR" or "24 HR" time format. A confirmation message "TIME FORMAT IS:", followed by the selected format, is displayed once the ENTER button is depressed. Operation then returns to the main menu.

When the SET TIME feature (F5) option is selected a nulled time is presented. If the format is 12 hour time, the nulled timed presented is 00:00 AM. If the format is 24 hour time, the nulled time presented is 00:00. The current field being set, for example minutes, is flashed on and off. The SELECT button advances numbers in the flashing field forward and the REVERSE button advances the list backward. The ENTER button is pressed once the correct numbers are presented. The next field to be set, for example hours, is then flashed on and off and set in the same manner. A confirmation message is presented when the last field is set and operation is returned to the main menu. If the MENU button is pressed before all fields are set, a null time (00:00—the default 12 HOUR) is used for the time. A confirmation message is presented and the user is returned to the main menu.

The SET DATE FORMAT feature (F6) works in a manner similar to the SET TIME FORMAT option and allows the user to select different date formats. The date may be set in either a month/day/year, day/month/year and year/month/day format. The month/day/year date format is the default. Upon entering the date format function the item M/D/YR is displayed on the text display segment 36. The SELECT button is depressed to advance through the possible date formats. The ENTER button is pressed to select a desired date format and a confirmation message "DATE FORMAT IS:", followed by the selected date format, is presented on the text display segment 36. Operation then returns to the main menu. If the MENU button is pressed the default (M/D/YR) is used for the date format and the user is returned to the main menu.

When the SET DATE feature (F7) is selected, a nulled date is presented in a manner similar to the presentation of a nulled time in the SET TIME option. If the format is month/day/year the date presentation is 00/00/00 with the first 00 flashing. The month field is the first field to flash for all formats. Once the month field is set the day field is set and then the year field is set. The current field being set flashes if there is no button active. Once the correct numbers are presented for the first field the ENTER button is pressed. The next field to be set then flashes. When the last field is set, a confirmation message is presented and the user returned to the main menu. If the MENU button is pressed during the date setting operation, the date is defaulted to 00/00/00. A confirmation message is presented and the user is returned to the main menu.

When the CAMERA DEMO feature (F9) is selected, messages explaining the meaning of various camera functions and the icon display segments 30 are presented on the text data display segment 36. For example, an exposure count is displayed on the alpha-numeric display segment 40 with the message "EXPOSURES REMAINING" displayed on the text display segment 36. Various camera warning messages can also be previewed. The camera warning messages include warning messages related to the user, such as "TOO CLOSE TO SUBJECT FOR PROPER FOCUS", and messages used to alert the user to photographic conditions, such as "LIGHT LEVEL TO LOW FOR PROPER EXPOSURE", as well as camera status messages stored in the memory unit 78.

The SET LANGUAGE feature (F9) permits the user to select which language will be used to display messages on the text display segment 36. The default language is English. The SELECT button is used to advance through a list of available languages including German, French, Spanish and Japanese (Kata-Kana). The ENTER button is used to select the desired language.

In the preferred embodiment, the optional title, like the roll title, is recorded on each print from a given roll when an exposure operation takes place. The print title is recorded on a given print and can be changed before each exposure. The optional title and roll title are preferably retained in temporary memory until a film cartridge is removed from the camera. Once the cartridge is removed, the camera control processor 60 automatically clears the temporary memory used to stored the roll and optional titles for printing, although they may have been saved in the roll title and optional title storage sections of the memory unit 78 for later recall and use with another film cartridge. Each of the titles may be readily changed by re-entering the main menu.

Figure 10A:
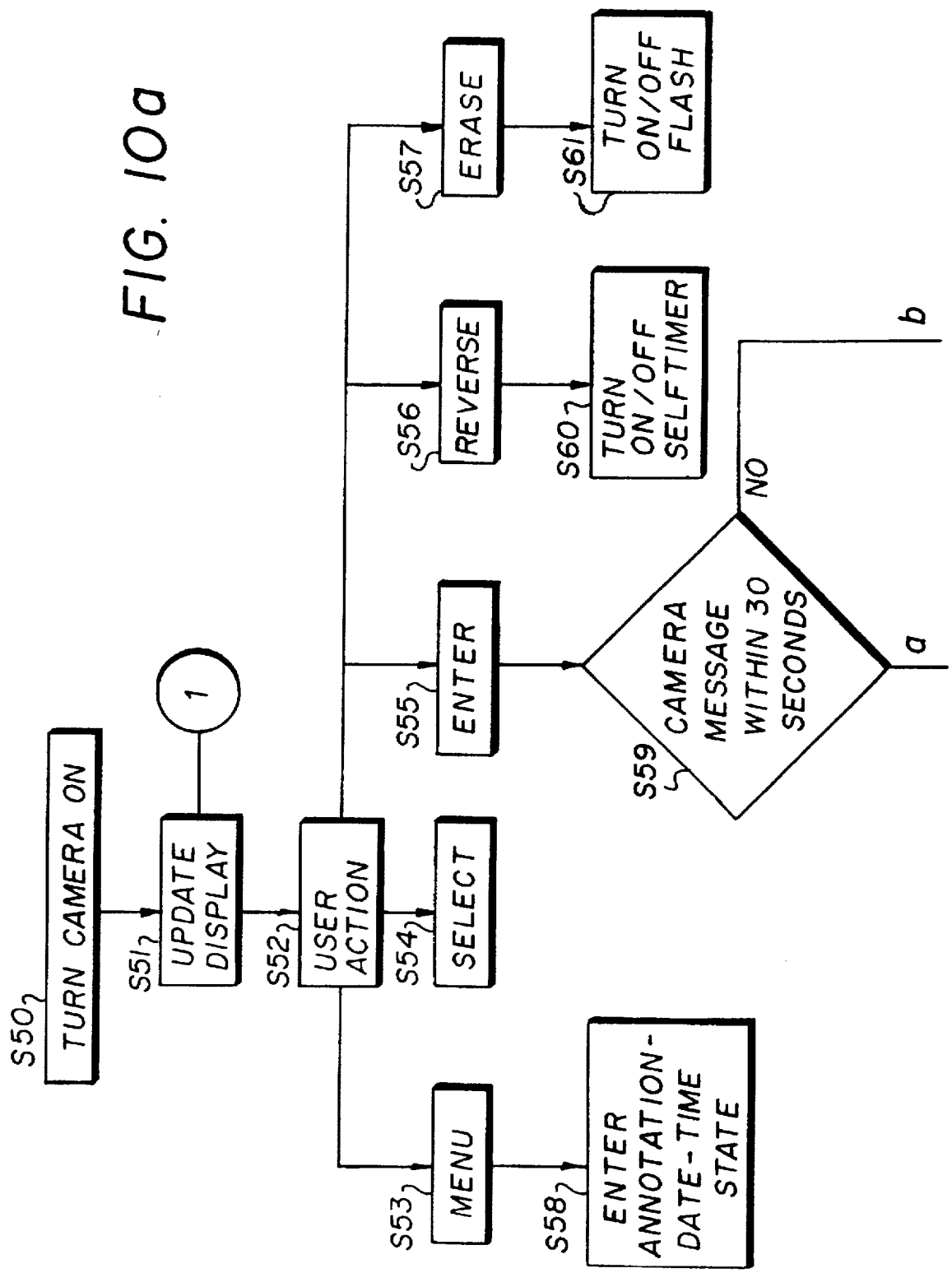
Figure 11:
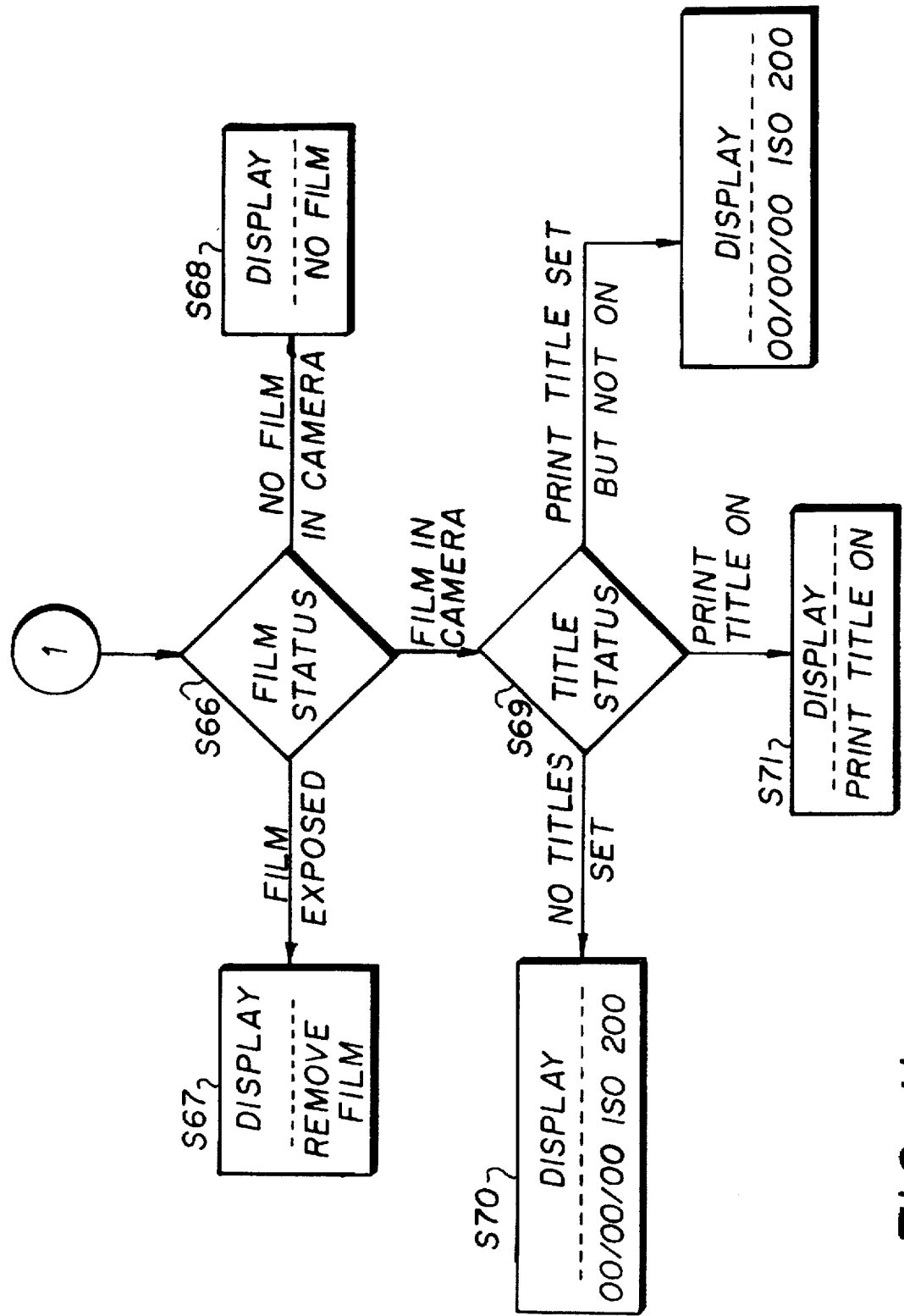
FIG. 11 is a general flow diagram illustrating the updating of the display unit illustrated in FIG. 6.

FIGS. 10a–10b illustrates a picture taking mode for the camera 10. The display unit 14 is updated (S51) after the camera is activated (S50). More specifically, as shown in FIG. 11, the display unit 14 is updated based on the film status state. Three possible film status states could be present upon camera activation: 1) there could be film in the camera with no exposures remaining; 2) there could be film in the camera with exposures remaining; and 3) there could be no film in the camera. If an exposed roll of film is in the camera, the text display segment 36 is controlled to display the message "REMOVE FILM" (S67). If there is no film in the camera, the text display segment 36 displays the message "NO FILM" (68). If there is film in the camera with exposures remaining, further updating of the display is dependent on title status (S69). If no titles have been set, a default display (S70) indicating the date and film ISO rating is displayed. If a print title has been entered it is displayed on the text data display segment 36 (S71). If a print title has not been entered but a roll title or optional title has been entered, the date and film ISO are displayed with an asterisk to indicate the presence of the roll or optional title. Alternatively, the roll or optional title can be displayed if desired.

The camera 10 then waits for further user action (S52) after updating the display unit 14 (FIGS. 10a–10b). The camera 10 enters the main menu to annotate titles, set time/date, etc., as was discussed above if the MENU button is depressed. If the REVERSE (selftimer) button is pressed and the selftimer is not on, a selftimer function indicator element 52 is activated on the icon display segment 38 and the message "SELFTIMER READY" is displayed on the text display segment 36. If the selftimer is already activated, it is deactivated when the REVERSE button is pressed. If the ERASE (flash) button is pressed and the flash unit 20 is off, the flash function indicator element 54 is activated and the message "FLASH ON" is presented on the text display segment 36. If the flash unit 20 is already activated, it will be deactivated by the pressing of the ERASE button. If the ENTER button is depressed, the action taken is dependent upon the time from the display of the last camera message. If a camera message had been presented during the previous thirty seconds prior to pressing the ENTER button, for example "WAIT FLASH CHARGING", the message is recalled so the user can review the message (S62). The presently set roll, print and optional titles are then displayed for review (S63, S64, S65). If no camera message had been presented in the previous 30 seconds, the titles are directly displayed. The text display segment 36 is then set to a preferred default condition, for example, the display of time and film ISO or the display of one of the titles.

Figure 12:
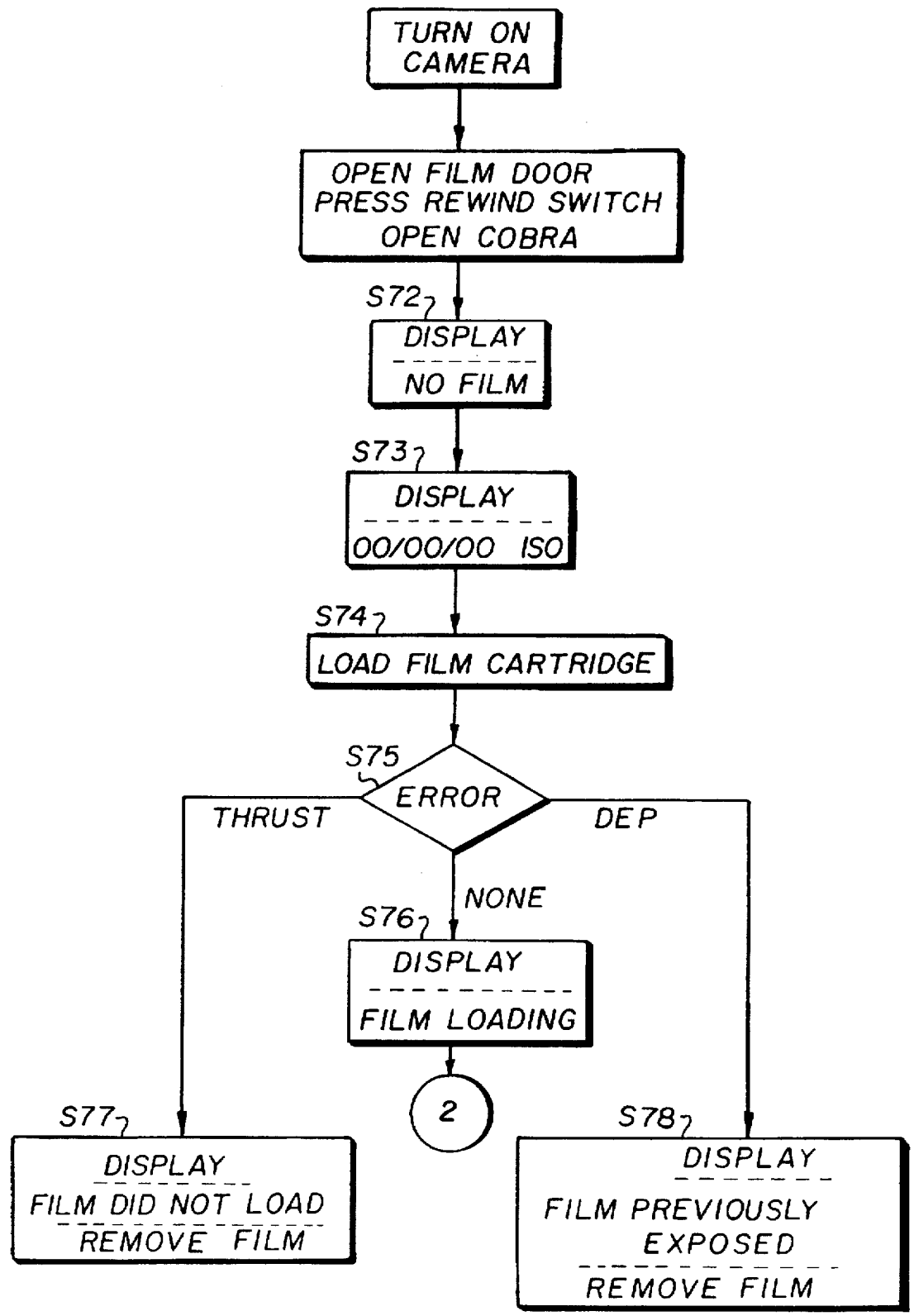
FIGS. 12 and 13 are general flow diagrams illustrating a film loading operation.
Figure 13:
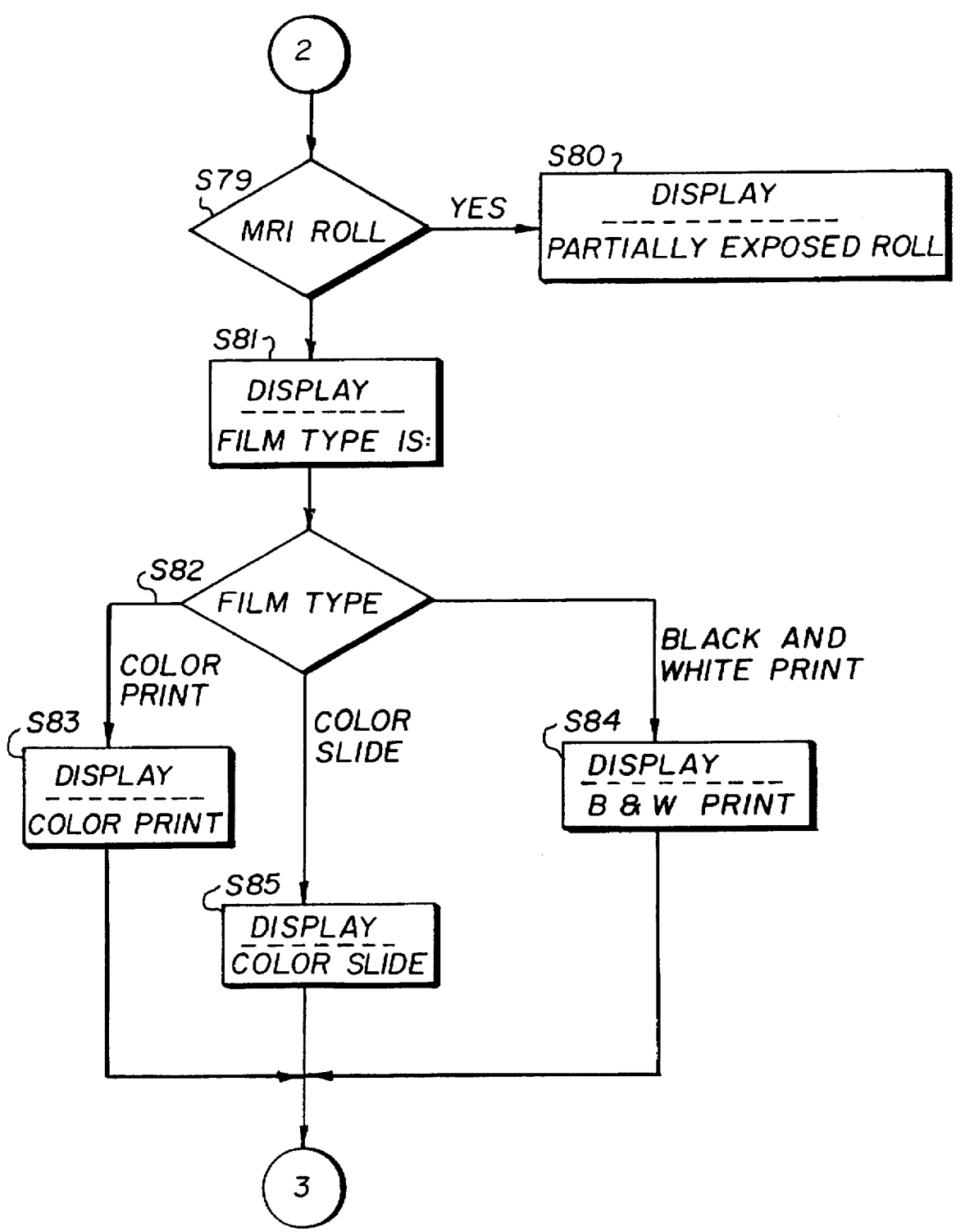
Figure 14:
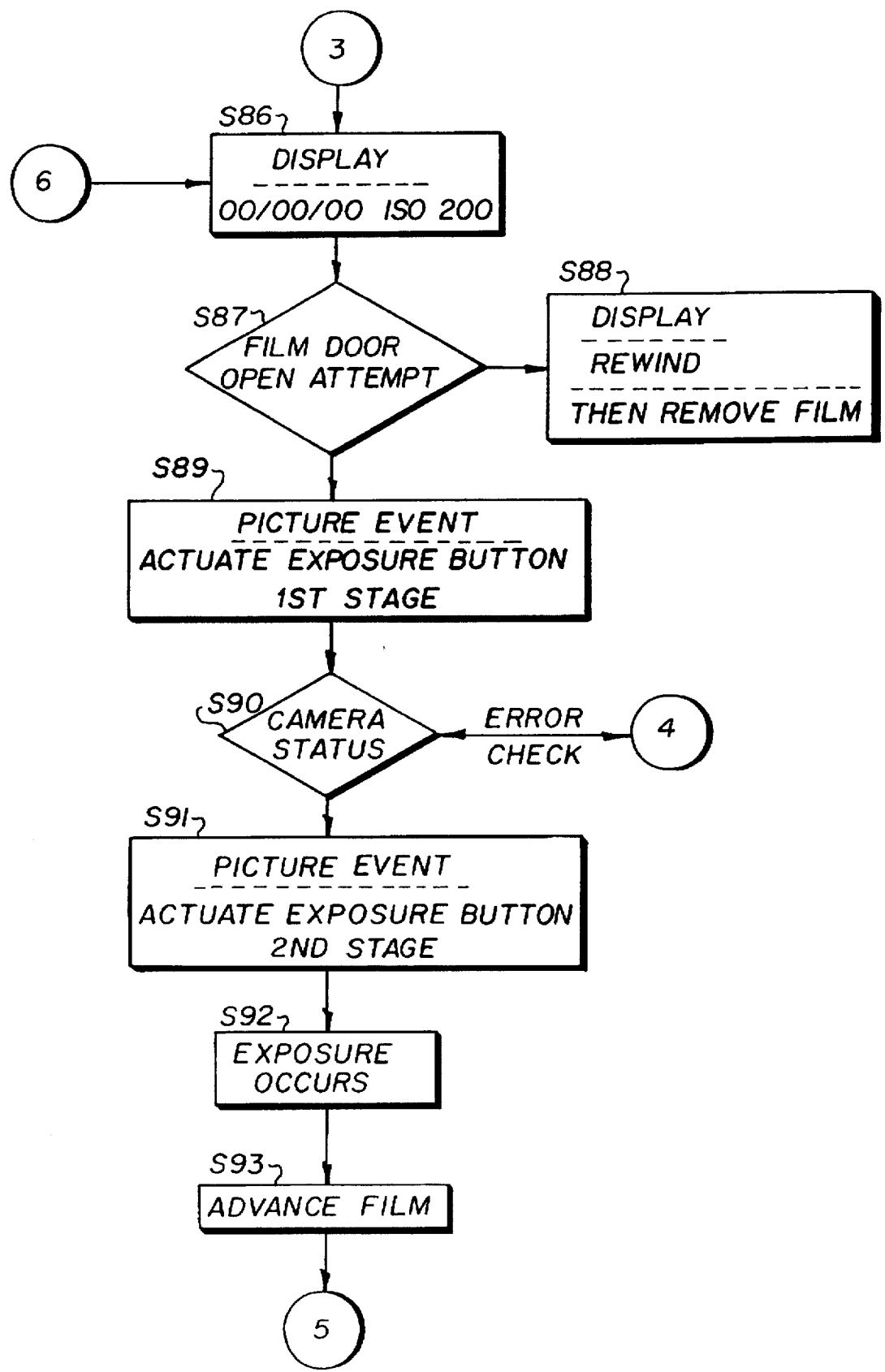
FIG. 14 is a general flow shown an exposure operation.
Figure 15:
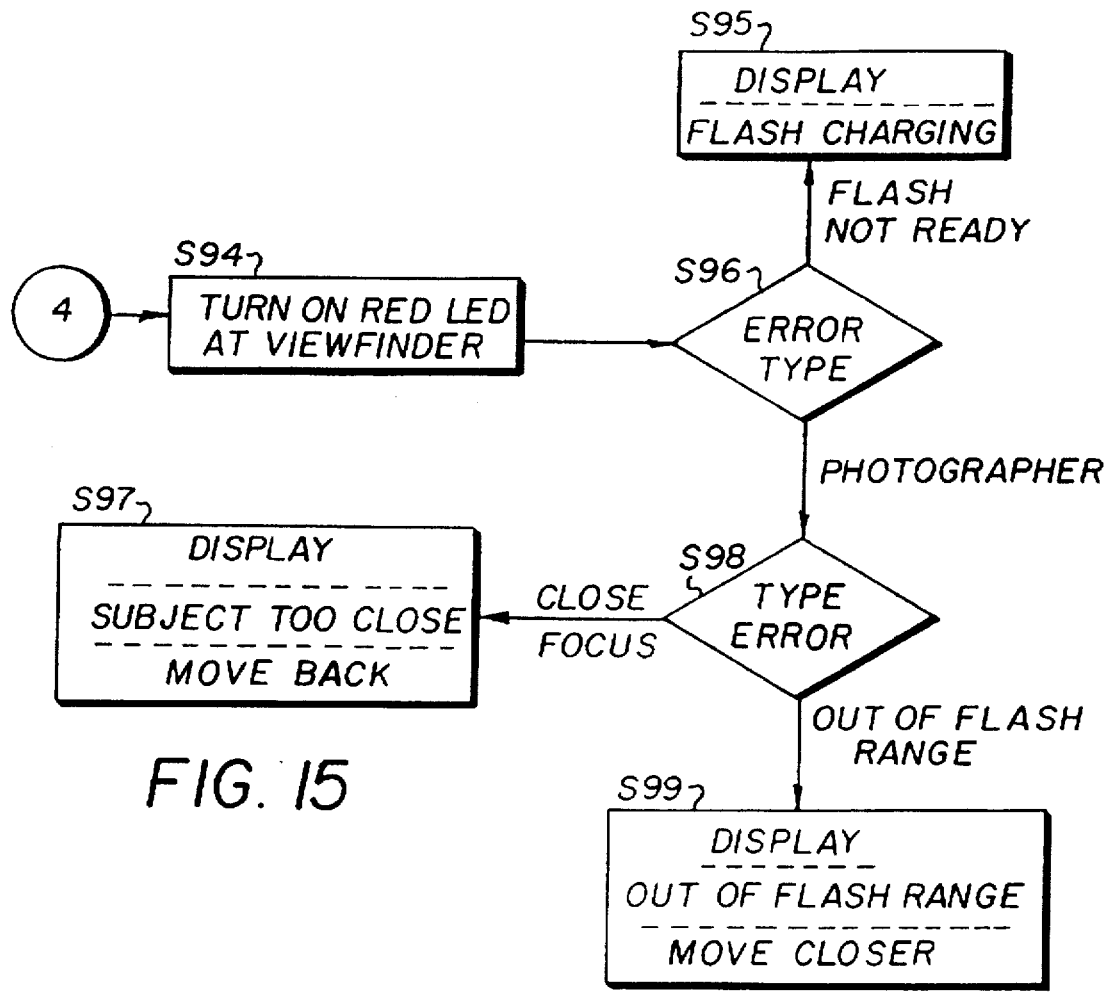
FIG. 15 is a general flow diagram showing an error checking operation.
Figure 16A:
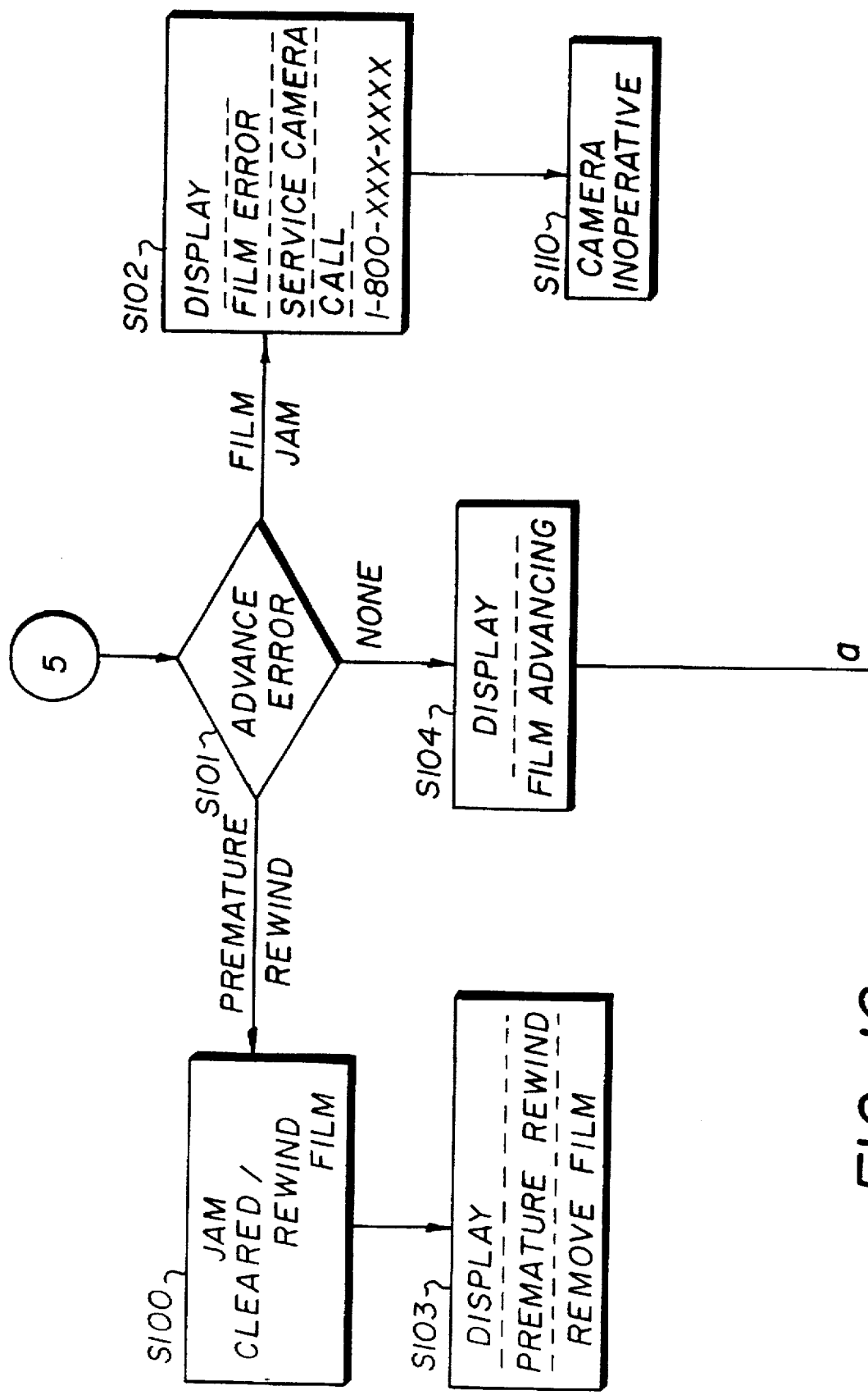
FIGS. 16a–16b a general flow diagram illustrating a film advancing operation.
Figure 16B:
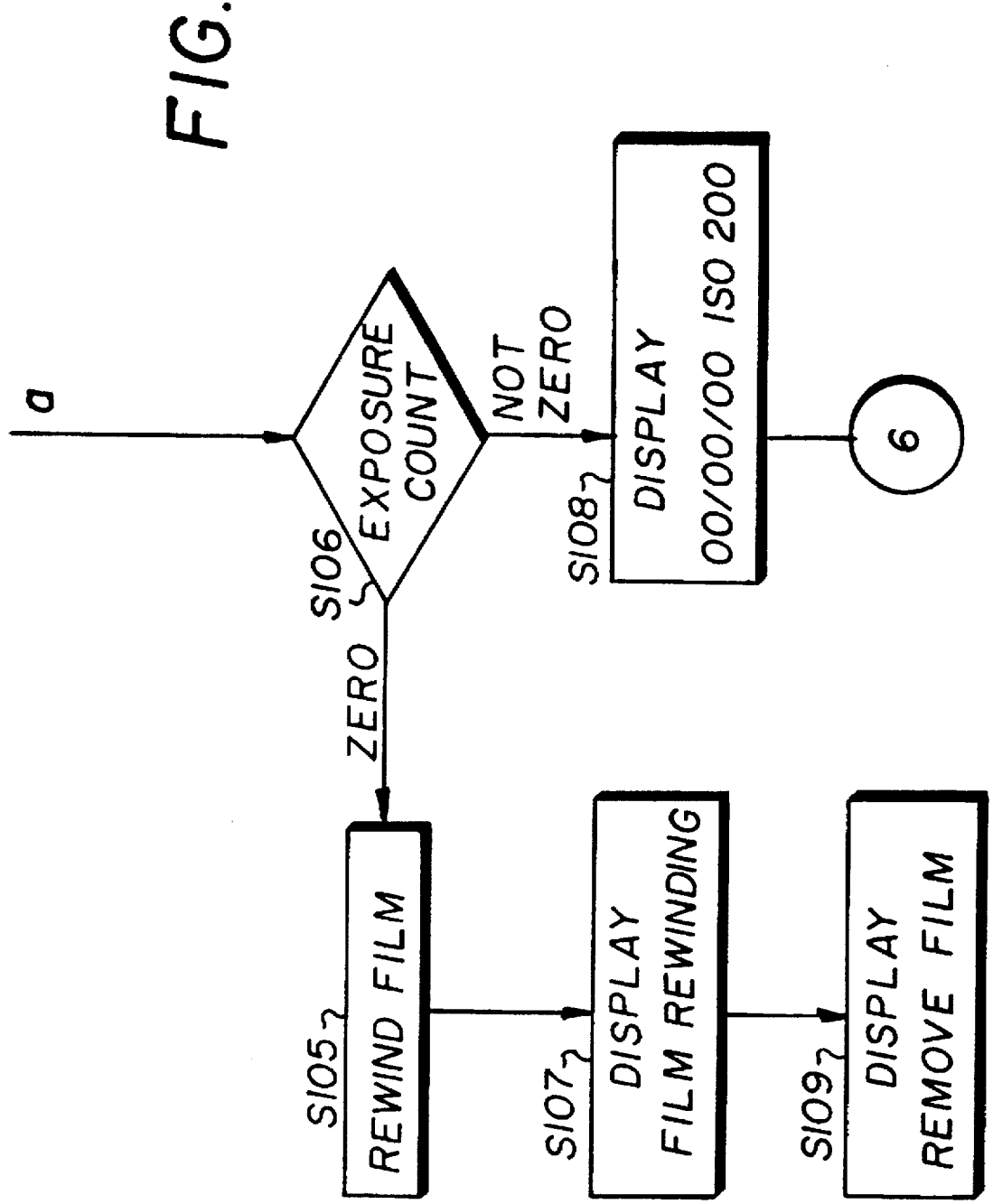

A camera message is a communication that relates to a camera related function or photographer related warning that occurs during a picture taking event. For example, errors can occur during the loading of a film cartridge or the advancement of the film between exposures. As shown in FIG. 12, the text display segment 36 displays the message "FILM LOADING" while the film is being automatically threaded if no problem is experienced (S76). If problems occur, however, camera warning messages are displayed in the text display segment 36. For example, if a previously exposed film cartridge is inserted into the camera 10, the message "FILM PREVIOUSLY EXPOSED-REMOVE FILM" is presented on the text display segment 36 (S78) as a double exposure prevention (DEP) feature. If the film does not advance properly, defined as a "Thrust" error, the message "FILM DID NOT LOAD-REMOVE FILM" is presented (S77). The detection of the insertion of a partially exposed roll of film is accomplished by reading information contained on the magnetic layer of the film by the data writing device which can also serve as a read head as explain above. If a partially exposed roll is inserted, the message "PARTIALLY EXPOSED ROLL" is presented (S80) as shown in FIG. 13 and the film is advanced to the next available. Once the film has been properly loaded, a message indicating the type of film "FILM TYPE IS:" is presented (S81) and the message indicating the type of film is inserted, for example, color print, black and white and color slide (S83, S84, S85). The display unit 14 is then updated with the date and ISO rating as shown in FIG. 14. If the user attempts to open the film door with the film loaded, the message "REWIND-THEN REMOVE FILM" is presented (S88). If the user presses down on the shutter control button 34 to take a picture (S89), initial error checking occurs when the first position of the shutter control button is reached. As was previously described, the shutter control button 34 is a two stage button in which the first stage initiates the exposure and autofocus mechanism and the second stage causes the exposure to occur. If an error is detected a red LED is lite in the viewfinder 12 (S94) and the appropriate error message is displayed on the text display segment 16 as shown in FIG. 15. The errors can be photographer related or camera related. For example, if the flash is not charged the message "FLASH CHARGING" is presented (S95) until the flash capacitor is charged. Photographer errors include being too close to the subject, out of flash range or not using the flash when required. The autofocusing system detects whether the photographer is to close to the subject and the message "SUBJECT TOO CLOSE- MOVE BACK" is presented (S97). The message either times out after one minute and the display is updated or the display is updated after an exposure is made. The out of flash range signal is also detected by the autofocusing system and the message "OUT OF FLASH RANGE-MOVE CLOSER" is presented (S99). This message either times out after one minute and the display is updated or the display is updated after an exposure is made. Once the exposure is made the film advances and the message "FILM ADVANCING" (S104) is presented as shown in FIGS. 16a–16b. Film advance errors are also indicated including a film jam or a premature rewind. A film jam error is indicated when the film is completely jammed and the camera will not operate. The message "FILM ERROR-SERVICE CAMERA-CALL-1-800-XXX-XXXX" (XXX-XXXX being the number of a service center) S102 is presented and the camera 10 is rendered inoperative. A premature rewind error happens when a film jam occurs but the camera is able to clear the jam. However, the camera logic may sense this as an end of roll and rewinds the film. The message "FILM REWINDING-FILM ERROR-REMOVE FILM" is presented (S103). Once the last exposure of the film cartridge has been exposed the film rewinds and presented the message "FILM REWINDING" (S107). Once the film is completely rewound the message "REMOVE FILM" (S109) is presented until the film cartridge is removed from the camera. If the exposure count has not been reached, the default display is presented on the text display segment 36.

Figure 17:
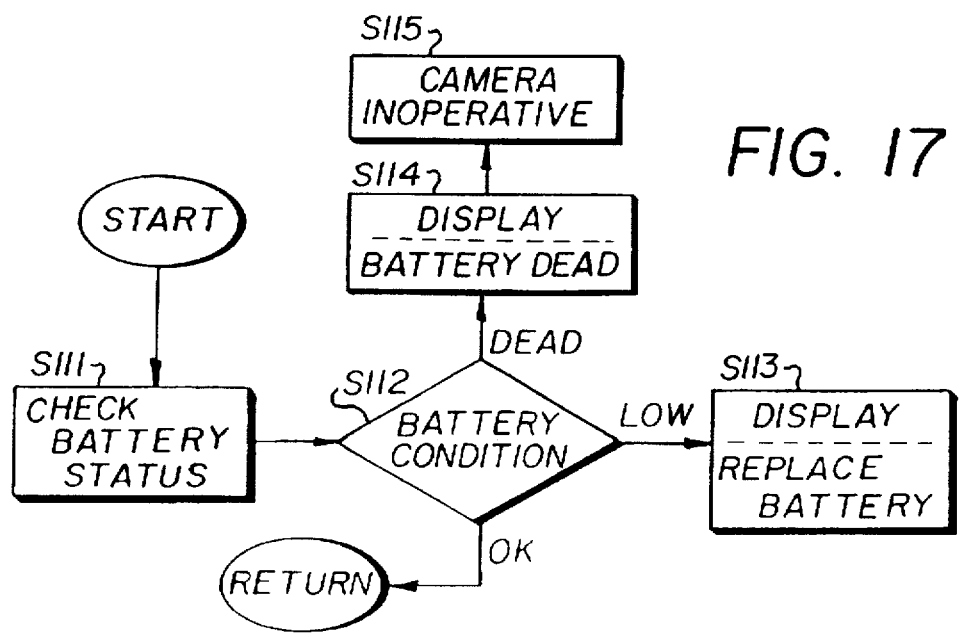
FIG. 17 is a general flow diagram illustrating a battery checking operation.

The battery status is also checked at various times by the camera control processor 60 using the routine illustrated in FIG. 17. If the battery is good the battery condition element appears for ten seconds when the camera 10 is turned on and then is shut off. If the battery is low, the message "REPLACE BATTERY" (S113) is presented when the battery is low. This message is presented until preceded by another message. If the "BATTERY DEAD" is presented (S114), the camera becomes inoperable (S115).

The incorporation of the text display segment 36 not only permits text data to be readily entered for recording on the film, but also allows a variety of information to be readily presented to the user. For example, in addition to the presentation of a camera demonstration feature, a complete user guide (or perhaps a travel guide indicating locations for good pictures) can be stored in the memory unit 78. The user guide can then be accessed through the use of the display interface to display the data in the user guide to the user on the text display segment 36. The amount of information that can be stored is limited by the amount of memory contained in the memory unit 78. The memory unit 78, however, can take the form of a removable memory device, such as a flash EEPROM memory card 80 (See FIG. 1), that can be inserted in the camera 10, thereby allowing an unrestricted prestored amount of information to be presented to the user. In a further embodiment, the camera 10 is provided with a data communication port 82 (See FIG. 1) that is coupled to the camera control processor 60 so that the camera 10 can be connected to a computer or a diagnostic device. Text data can then be downloaded to the camera from the computer or diagnostic device for recording on the film or for display on the text display segment 36.

It should further be noted that the illustrated embodiment of the camera 10 is loaded from the bottom. Thus, the user generally turns the camera upside down to load a film cartridge. In such a position, it is not easy for the user to readily read messages presented on the text display segment 36. Accordingly, a position detector switch 84 (FIG. 6) is preferably provided to detect when the camera is turned over. The camera control processor 60 then controls the text display segment 36 to display inverted messages that can be readily read by the user when loading film. The inverted function can also be performed without the use of a separate detector switch by driving the text display segment 36 in the inverted mode when the film loading door 30 is opened.

Figure 18:
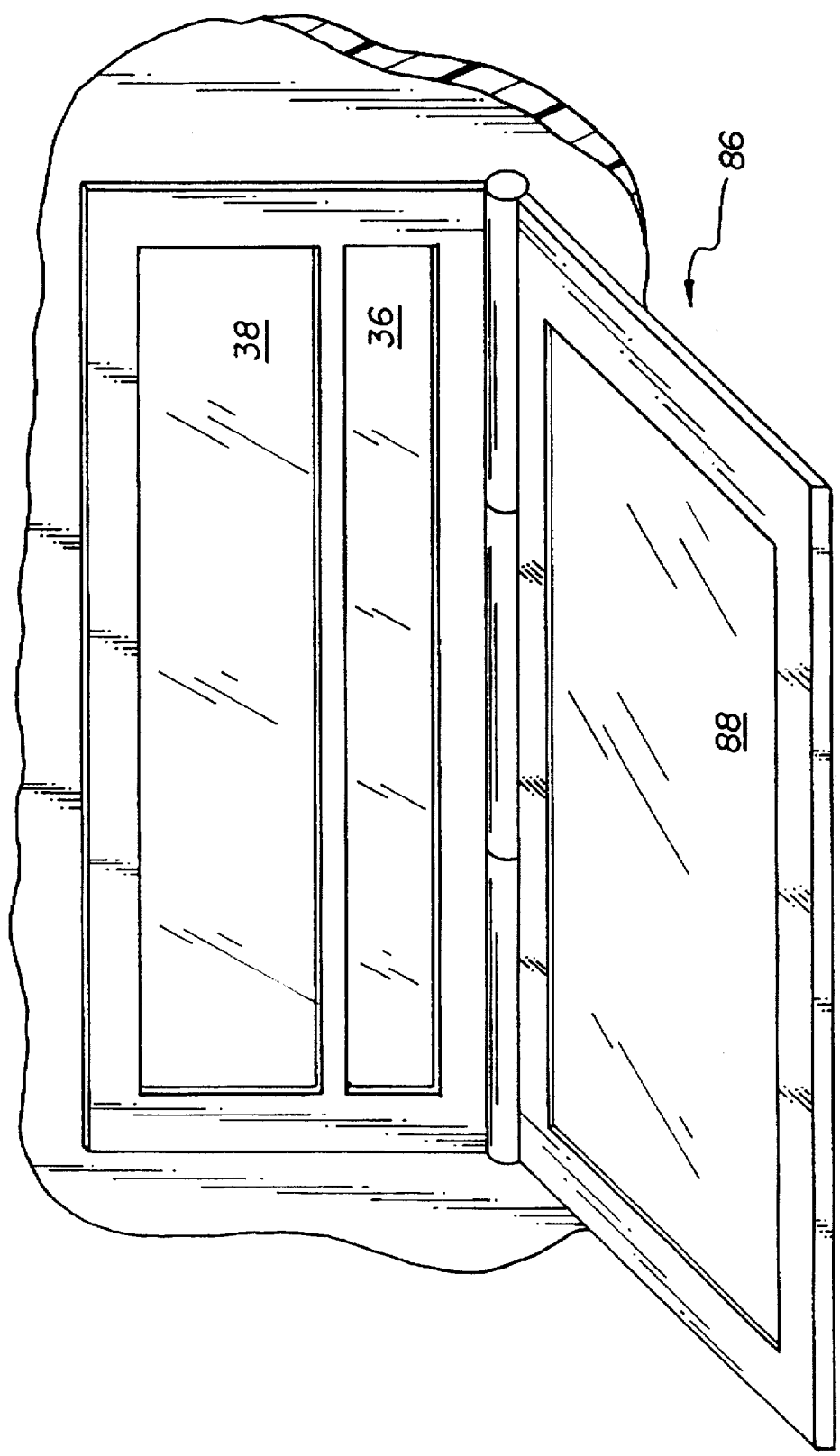
FIG. 18 is an illustration of a display unit that includes a flip cover with an additional text display segment.
Figure 19:
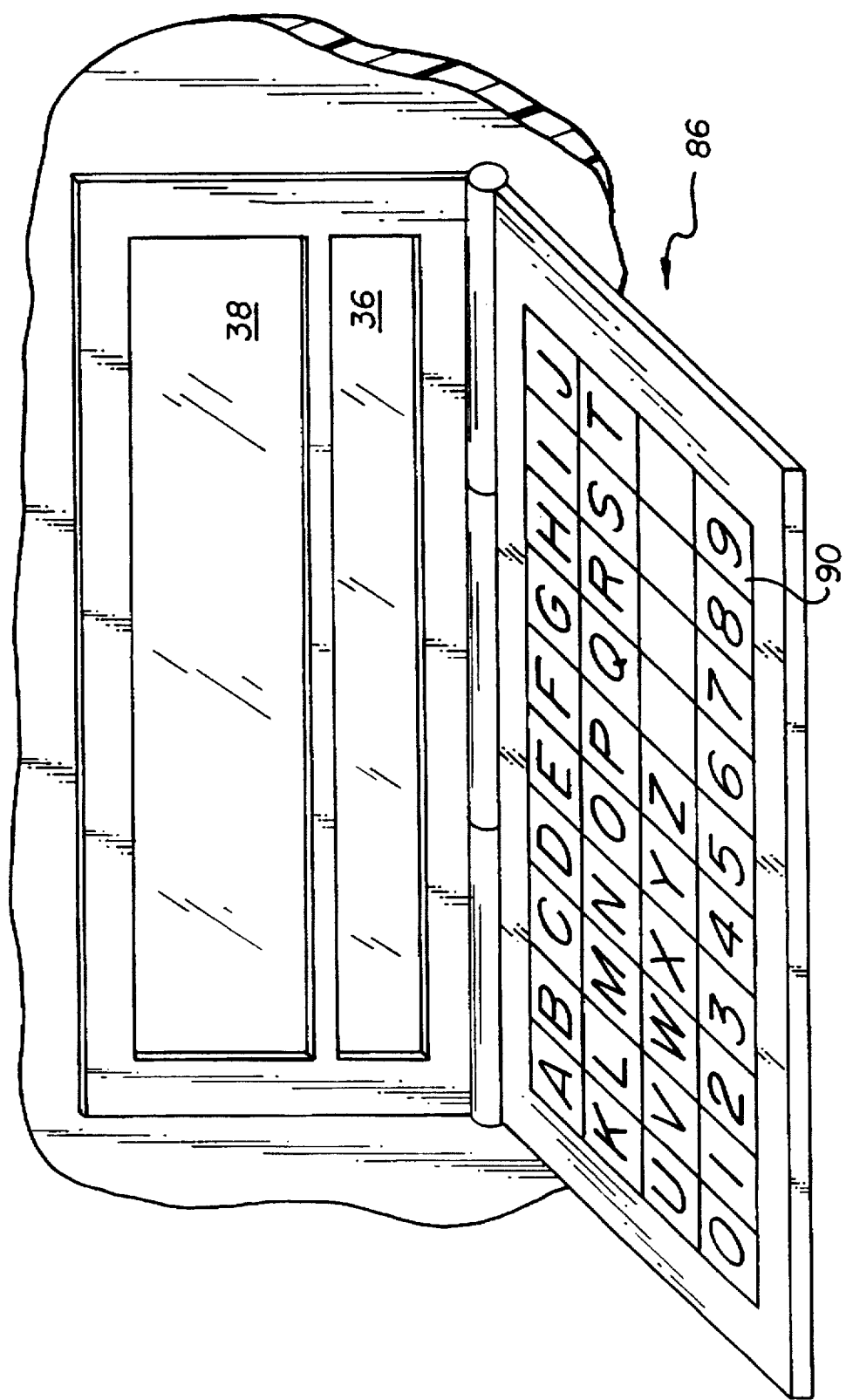
FIG. 19 is an illustration of a display unit that includes a flip cover with a keyboard.

The invention has been described with reference to certain preferred embodiment thereof. It will be understood, however, that modifications and variations are possible within the scope of the appended claims. For example, the size and type of the text display segment 36 is not limited to the specifically disclosed embodiment, but can also include multi-line displays or a full graphic display instead of individual matrix elements. In a further embodiment, for example, a flip-cover 86 as shown in FIG. 18 is provided as part of the display unit 14. The flip-up cover 86 includes an additional text display segment 88 that is exposed when the flip-cover is opened so that additional text data can be readily displayed. As shown in FIG. 19, a small text entry keyboard 90 can also be provided on the flip-up cover 86 in place of the additional text display segment 88, thereby allowing the user to enter text data by touching the keys of the keyboard 90 with a stylus. Alternatively, one or more of the text, icon or alpha-numeric display segments can be located on the front surface of the flip-cover, and the additional display segments can be exposed when the flip-cover is opened The invention can also be incorporated in a data back accessory that is sold separately from a complete camera unit.

Reference Numbers

10 Camera
12 Viewfinder
14 Display Unit
16 Display Control Interface
18 Lens System
19 Lens Cover Slide Switch
20 Electronic Flash Unit
22 Autofocus Sensor
24 Light Metering Sensor
26 Telephoto Control Switch
27 Tracking Ball
28 Latch Mechanism
30 Film Loading Door
32 Rewind Control Switch
34 Shutter Control Switch
36 Text Display Segment
38 Icon Display Segment
40 Alpha-Numeric Display Segment
42 Matrix Elements
44 Film Cartridge/Film Advance Element
46 No Film Advance Element
48 Battery Condition Element
50 "OK" Indicator Element
52 Self-Timer Function Indicator Element
54 Flash Function Indicator Element
56 Autofocus Function Indicator Element
58 Alpha-Numeric Elements
60 Camera Control Processor
62 Film Cartridge Sensor
64 Film slot
66 Lens Driver
68 Aperture
70 Aperture Driver
72 Shutter Mechanism
74 Motorized Film Advance Unit
76 Data Writing Device
78 Memory Unit
79 Roll Title Storage Section 80 Memory Card
81 Print Title Storage Section
82 Communication Port
83 Optional Title Storage Section
84 Position Detector Switch
85 Camera Message Storage Section
86 Flip Cover
88 Text Display Segment
90 Keyboard
91 Storage Location

What is claimed:

1. A camera comprising:

a display unit; a display control interface for manually selecting text data including a roll title, selected once, and a plurality of separately entered print titles to be displayed on the display unit; text data recording means for recording the text data selected by the display control interface on photographic film; means for exposing a plurality of frames of the photographic film; and a control unit for controlling the operation of the display unit to display the text data selected by the display control interface, and for controlling the operation of the text data recording means to print the once selected roll title on each exposed frame of the photographic film and the separately entered plurality of print titles on corresponding exposed frames.

2. A camera as claimed in claim 1, wherein the display unit includes a text data display section and fixed icon display section.

3. A camera as claimed in claim 1, further comprising storage means for storing the text data selected by the display control interface in non-volatile memory.

4. A camera as claimed in claim 3, wherein at the storage means includes means for storing preloaded text data that can be selected by the display user interface for display on the display unit.

5. A camera as claimed in claim 4, wherein the prestored text data includes camera messages that are displayed on the display unit under control of the control unit in response to predetermined camera conditions.

6. A camera comprising:

a display unit; a display control interface for manually selecting text data to be displayed on the display unit; a control unit for controlling the operation of the display unit to display the text data selected by the manual user interface; and a telephoto lens system that is adjusted based on a signal generated from a telephoto control switch;

wherein the signal generated from the telephoto control switch is utilized as part of the display control interface to select the text data.

7. A camera comprising:

a display unit; a display control interface for manually selecting text data to be displayed on the display unit; a control unit for controlling the operation of the display unit to display the text data selected by the manual user interface; and position detection means for detecting the position of the camera;

wherein the control unit controls the operation of the display unit to display the text data in an inverted position when the position detection means detects that the camera has been inverted.

* * * * *